(12) United States Patent
Yamaki et al.

(10) Patent No.: US 8,840,830 B2
(45) Date of Patent: *Sep. 23, 2014

(54) METHOD OF MOLDING

(75) Inventors: Shigeru Yamaki, Tokyo (JP); Hideo Miyata, Tokyo (JP); Nobuyuki Mitarai, Tokyo (JP); Nobuaki Ishii, Tokyo (JP); Katsumi Murofushi, Tokyo (JP); Kunio Yoshida, Yokohama (JP)

(73) Assignee: AJI Co., Ltd., Kanagawa (JP)

( * ) Notice: Subject to any disclaimer, the term of this patent is extended or adjusted under 35 U.S.C. 154(b) by 374 days.

This patent is subject to a terminal disclaimer.

(21) Appl. No.: 13/131,961

(22) PCT Filed: Nov. 13, 2009

(86) PCT No.: PCT/JP2009/069364
§ 371 (c)(1), (2), (4) Date: May 31, 2011

(87) PCT Pub. No.: WO2010/064534
PCT Pub. Date: Jun. 10, 2010

(65) Prior Publication Data
US 2011/0227239 A1    Sep. 22, 2011

(30) Foreign Application Priority Data
Dec. 1, 2008 (JP) ................................ 2008-305975

(51) Int. Cl.
  *B29C 35/08*    (2006.01)
  *B29D 11/00*    (2006.01)
(52) U.S. Cl.
  USPC ........................... 264/496; 264/1.36; 264/296
(58) Field of Classification Search
  USPC ......... 264/1.1, 1.36, 1.38, 2.7, 494, 496, 284, 264/293, 296
  See application file for complete search history.

(56) References Cited

U.S. PATENT DOCUMENTS

| | | | |
|---|---|---|---|
| 5,629,358 A | 5/1997 | Nagahata et al. | |
| 8,349,934 B2 * | 1/2013 | Murofushi et al. | 524/424 |
| 8,540,906 B2 * | 9/2013 | Yoshida | 264/1.32 |
| 2005/0162733 A1 * | 7/2005 | Cho et al. | 359/361 |
| 2007/0191506 A1 * | 8/2007 | Lu et al. | 522/178 |
| 2010/0181691 A1 | 7/2010 | Yoshida | |
| 2010/0259821 A1 | 10/2010 | Kaida et al. | |
| 2010/0289163 A1 | 11/2010 | Yoshida | |

FOREIGN PATENT DOCUMENTS

| | | |
|---|---|---|
| JP | 62-143908 A | 6/1987 |
| JP | 3-151393 A | 6/1991 |

(Continued)

*Primary Examiner* — Mathieu D. Vargot
(74) *Attorney, Agent, or Firm* — Sughrue Mion, PLLC

(57) ABSTRACT

There is provided a method of molding which is capable of more highly precisely molding a molded article to be molded such as a lens than conventional technologies.

A molded article such as a lens array and a mold for nanoimprinting is molded by repeating multiple times a transfer step including: a transformation step of bringing a light curable composition containing a compound having a polymerizable functional group and a polymerization initiator into contact with a transfer member 62 on which a transfer shape portion shaped equally to or reversely to an aspherical lens portion 312 is formed to transform the light curable composition to the transfer shape of the transfer member 62; a curing step of irradiating at least a transformed portion of the transformed light curable composition with light by a light irradiation unit 60 to cure the light curable composition; and a separation step of separating the cured light curable composition and the transfer member.

18 Claims, 10 Drawing Sheets

(56) References Cited

FOREIGN PATENT DOCUMENTS

| | | |
|---|---|---|
| JP | 5-202146 A | 8/1993 |
| JP | 2003-94445 A | 4/2003 |
| JP | 2004-217836 A | 8/2004 |
| JP | 2005-41125 A | 2/2005 |
| WO | 2008/153102 A1 | 12/2008 |
| WO | 2009/041646 A1 | 4/2009 |
| WO | 2009/093382 A1 | 7/2009 |

* cited by examiner

METHOD OF MOLDING

CROSS REFERENCE TO RELATED APPLICATIONS

This application is a National Stage of International Application No. PCT/JP2009/069364, filed on Nov. 13, 2009, which claims priority from Japanese Patent Application No. 2008-305975, filed on Dec. 1, 2008, the contents of all of which are incorporated herein by reference in their entirety.

TECHNICAL FIELD

The present invention relates to, for example, a method of molding a lens such as a lens array provided with an aspherical lens portion and a molded article such as a mold used for molding such a lens.

BACKGROUND ART

Patent Document 1 discloses a method of producing a micro lens array using a mold having a surface for forming a lens shape. The method includes the steps of: forming multiple lens substrates by using the mold to cure a first resin into the lens shape on a first substrate; arranging the lens substrates in an array; forming a master having a surface for forming the lens shape by plating the arrayed lens substrates; forming a mother by plating the master surface for forming the lens shape; forming a molding die using the mother; curing and forming a second resin into the lens shape on a second substrate using the molding die; and performing dry etching to remove the second resin and part of the second substrate.

Moreover, Patent Document 2 discloses a method of producing a fine structure by sequentially transferring a fine pattern on the surface of a mother stamper. The method includes the steps of: (1) fixing the mother stamper at a specified position of a substrate; (2) supplying a resin between the mother stamper and the substrate; (3) pressing the mother stamper against the resin in vacuum; (4) curing the resin; (5) separating the mother stamper from the cured resin; (6) moving the mother stamper or the substrate so as to change a relative position between the mother stamper and the substrate; and (7) repeating the steps (2) through (6) for a specified number of times after the step (6).

[Patent Document 1] JP-A No. 2005-41125
[Patent Document 2] JP-A No. 2003-94445

DISCLOSURE OF THE INVENTION

Problems to be Solved by the Invention

However, the technologies disclosed in Patent Documents 1 and 2 make it difficult to fabricate a highly precisely molded article such as an aspherical lens.

It is an object of the present invention to provide a method of molding which is capable of more highly precisely molding molded articles such as a lens than conventional technologies.

Means for Solving the Problems

The present invention is a method of molding comprising: a transformation step of making contact between an article to be molded and a transfer member and transforming the article to be molded to a transfer shape formed on the transfer member, the transfer shape being formed equally to or reversely to an aspherical lens portion; a curing step of curing at least a transformed portion of the article to be molded; a separation step of separating the article to be molded and the transfer member from each other; and a moving step of moving the transfer member to another position of the article to be molded, wherein a transfer step of transferring the transfer shape to an article to be molded is repeated multiple times. The article to be molded includes a curable composition containing a compound having a polymerizable functional group and a polymerization initiator.

Preferably, the curable composition includes (a) silica fine particles: (b) a (meth)acrylate having at least two ethylenically unsaturated groups and no cyclic structure; (c) a (meth)acrylate having an ethylenically unsaturated group and an alicyclic structure; and (d) a polymerization initiator, and the silica fine particles (a) are surface-treated with a silane compound (e) represented by the following general formula (1) and a silane compound (f) represented by the following general formula (2):

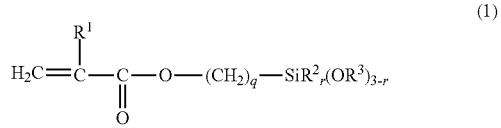

(in general formula (1), R1 represents a hydrogen atom or a methyl group; R2 represents a C1 to C3 alkyl group or a phenyl group; R3 represents a hydrogen atom or a C1 to C10 hydrocarbon group; q is an integer from 1 to 6; and r is an integer from 0 to 2.)

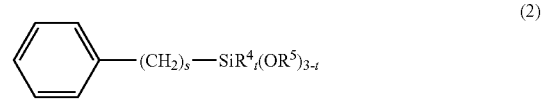

(in general formula (2), R4 represents a C1 to C3 alkyl group or a phenyl group; R5 represents a hydrogen atom or a C1 to C10 hydrocarbon group; s is an integer from 0 to 6; and t is an integer from 0 to 2.).

Preferably, the (meth)acrylate (b) contained in the curable composition is a (meth)acrylate having three ethylenically unsaturated groups and no cyclic structure.

Preferably, the silica fine particles (a) contained in the curable composition are surface-treated with 5 to 25 parts by weight of the silane compound (e) with respect to 100 parts by weight of the silica fine particles (a) and 5 to 25 parts by weight of the silane compound (f) with respect to 100 parts by weight the silica fine particles (a).

Preferably, a glass transition temperature of the homopolymer of the (meth)acrylate (b) and a glass transition temperature of the homopolymer of the (meth)acrylate (c) contained in the curable composition are both 150° C. or higher.

Preferably, the viscosity of the curable composition is 30 to 300 mPa·s.

Effect of the Invention

According to the present invention, it is possible to provide a method of molding which is capable of more highly precisely molding a molded article such as a lens than conventional technologies.

BRIEF DESCRIPTION OF THE DRAWINGS

FIG. 1 A schematic configuration of a molding apparatus according to a first embodiment of the present invention, wherein

EXPLANATION OF REFERENCES

Figure 1A:
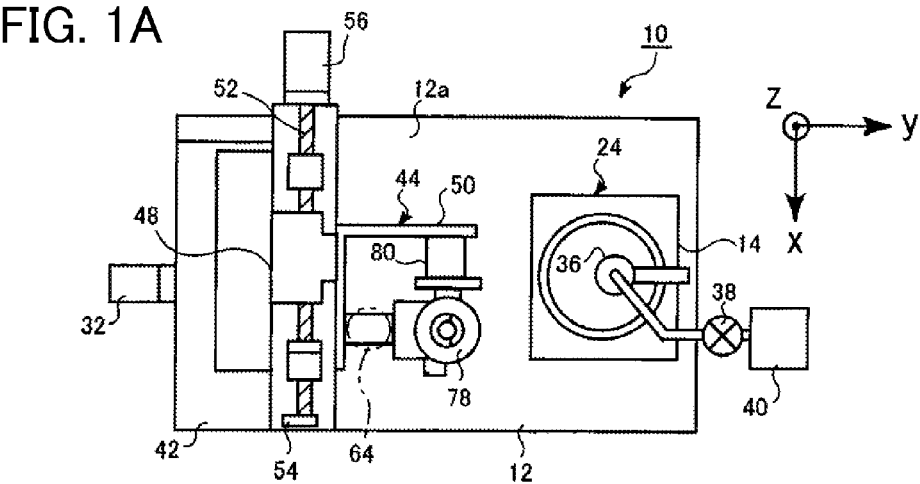
FIG. 1A is a plan view and FIG. 1B is a left side view.

10 Molding apparatus
14 Support base
18 Driving source
24 Movable base
32 y-axis motor
34 θ-axis motor
36 Supply apparatus
44 Movable unit
56 x-axis motor
60 Light irradiation unit
62 Transfer member
64 z-axis motor for the supporting member
68 Optical fiber
70 Light source
72 Detection apparatus
74 Imaging portion
76 Lens unit
90 Protruded portion
200 Control apparatus
204 Main control portion
300 Mold
304 Lens array
310 Cemented lens array
312 Lens portion
314 Lens
W Wafer
W1 Substrate
W2 Holding plate
h1 Through-hole
h2 Hole

BEST MODE FOR CARRYING OUT THE INVENTION

Embodiments of the present invention will be described with reference to the accompanying drawings.

Figure 1B:
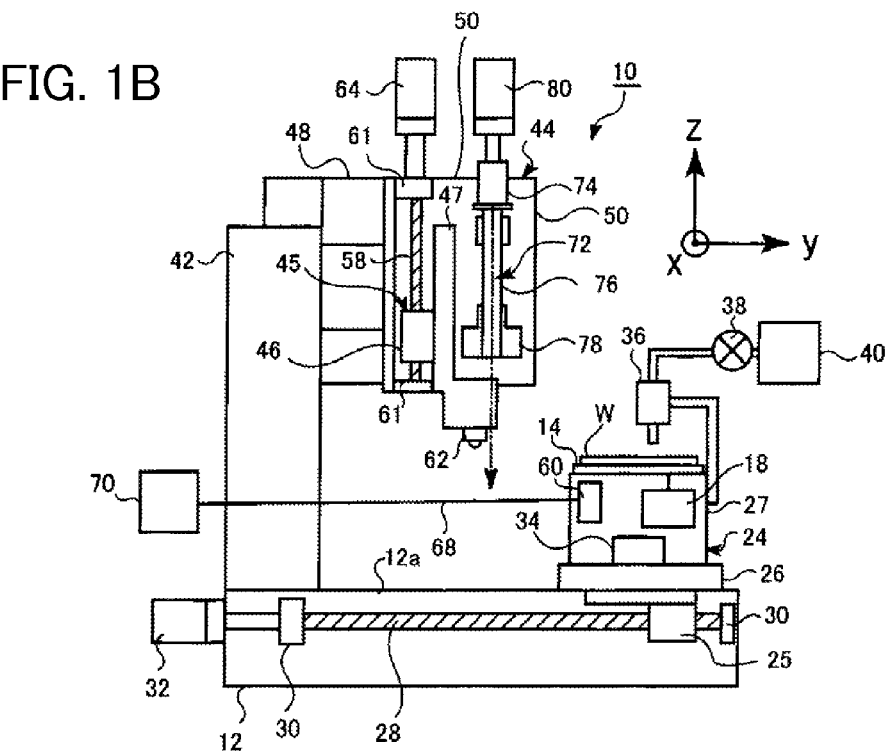

FIG. 1 shows a molding apparatus 10 according to the first embodiment of the present invention. The molding apparatus 10 is used for molding of a lens array which is a molded article and an optical part. The molding apparatus 10 has a base 12 placed on a mounting surface. A movable base 24 is supported on the base 12. A support base 14 is further supported on the top of the movable base 24.

The movable base 24 includes a lower part 26 and an upper part 27. The lower part 26 includes a projecting portion 25 that is formed so as to project downward. The upper part 27 is positioned over the lower part 26. The projecting portion 25 is attached to the base 12 so as to engage in a groove (not shown) that is formed in an upper surface 12a of the base 12 along a y-axis direction. The movable base 24 is guided through the groove in the y-axis direction and is movable on the surface 12a in the y-axis direction. The projecting portion 25 engages with a feed screw 28. The feed screw 28 is rotatably supported at bearings 30, 30 by the base 12 so that the shaft direction (longer direction) corresponds to the y-axis direction. A left end of the feed screw 28 in FIG. 1 connects with a y-axis motor 32 that is fixed to the base 12. Rotating the y-axis motor 32 transmits a driving force to the projecting portion 25 via the feed screw 28 to move the movable base 24 in the y-axis direction. Controlling the rotation direction of the y-axis motor 32 determines in which direction the movable base is to be moved along the y-axis.

A θ-axis motor 34 is provided for the upper part 27 of the movable base 24. The θ-axis motor 34 rotates the upper part 27 of the movable base 24 around a rotation axis perpendicular to the z-axis with reference to the lower part 26 of the movable base 24. As a whole, the movable base 24 is movable in the y-axis direction. The upper part 27 is rotatable with reference to the lower part 26.

A wafer W made of glass, for example, is mounted on the support base 14. The support base 14 supports the mounted wafer W against the direction of gravitational force. The support base 14 is coupled with a driving source 18 including a motor, for example. The support base 14 is capable of moving with the wafer W with reference to the upper part 27 of the movable base 24. That is, the support base 14 is configured as a turning table used for the spin coat. The spin coat is used to apply the curable composition to the wafer W. Instead, multiple holes h2 (see FIG. 2) may be formed in the wafer W. The molding apparatus 10 may be provided with an injection apparatus (not shown) for injecting the curable composition. The injection apparatus may inject the resin into the holes h2 formed in the wafer W.

The support base 14 may use an optically transparent material such as glass so as to pass light radiated from a light irradiation unit 60 to be described later. A mounting/dismounting apparatus (not shown) such as a robot may or an operator may manually mount the wafer W on the support base 14 and dismount the wafer W mounted on the support base 14.

The upper part 27 of the movable base 24 is provided with a supply apparatus 36 that supplies the wafer W with a light curable composition used as a master material. A reservoir portion 40 for reserving the light curable composition is connected to the supply apparatus 36 through a valve 38. The supply apparatus 36 is capable of supplying the light curable composition reserved in the reservoir portion 40 so that the light curable composition drops from above approximately at the center of the approximately circular wafer W (disk-shaped). The light curable composition supplied onto the wafer W spreads due to a centrifugal force from the support base 14 that rotates for a specified time period. The light curable composition is consequently applied to the surface of the wafer W with an approximately uniform thickness.

The upper part 27 of the movable base 24 is provided with the light irradiation unit 60 used as a curing apparatus. The light irradiation unit 60 is connected to a light source 70 through an optical fiber 68 used as light transmission means. The light irradiation unit 60 is used to radiate light to the light curable composition applied to the wafer W. According to the embodiment, the light irradiation unit 60 is provided below the support base 14, the wafer W, and the light curable composition applied to the wafer W opposite to a transfer member 62 to be described later. Accordingly, the light can be radiated to the light curable composition without being interrupted by the transfer member 62 while the transfer member 62 remains in contact with the light curable composition.

The movable base 24 is attached to the base 12 and a supporting post 42 is fixed thereto. A movable unit 44 is attached to the supporting post 42 so as to be movable in an x-axis direction with reference to the supporting post 42. The movable unit 44 includes a left-sided part 48 positioned to the left of the drawing and a right-sided part 50 fixed to the left-sided part 48. The left-sided part 48 is supported by the supporting post 42 so as to be movable in the x-axis direction and is engaged with a feed screw 52. The feed screw 52 is rotatably attached to the supporting post 42 by a bearing 54 so that the screw shaft direction corresponds to the x-axis direction.

One end of the feed screw 52 is coupled with an x-axis motor 56 attached to the supporting post 42. Rotating the x-axis motor 56 transmits a driving force of the x-axis motor 56 to the left-sided part 48 via the feed screw 52. The left-sided part 48 and the right-sided part 50 of the movable unit 44 move together in the x-axis direction. Controlling the rotation direction of the x-axis motor 56 determines in which direction the movable unit 44 is to be moved along the x-axis.

The right-sided part 50 of the movable unit 44 is attached with the transfer member 62 via a supporting member 45. The supporting member 45 is attached to the movable unit 44 so as to be movable in the z-axis direction. The movable unit 45 includes a projecting portion 46 projecting toward the left in FIG. 1 and a supporting portion 47 fixed to the projecting portion 46. The transfer member 62 is detachably attached to a downward surface of the supporting portion 47, for example. The transfer member 62 can be selected from differently shaped and sized ones depending on shapes of lenses to be formed and types of the curable composition used as articles to be molded.

A feed screw 58 is screwed through the projecting portion 46. The feed screw 58 is rotatably attached to the right-sided part 50 of the movable unit 44 using bearings 61, 61 so that the screw axis direction corresponds to the z-axis direction. The top end of the feed screw 58 is coupled to a z-axis motor 64 for the supporting member. Rotating the z-axis motor 64 for the supporting member transmits a driving force to the supporting member 45 via the feed screw 58. The supporting member 45 and the transfer member 62 supported by the supporting member 45 move together in the z-axis direction.

A detection apparatus 72 is attached to the right-sided part 50 of the movable unit 44 so as to be vertically movable (in the z-axis direction) independently of the supporting member 45. The detection apparatus 72 is used as detection means for detecting positions of the wafer W and the transfer member 62. The detection apparatus 72 includes: an imaging portion 74 exemplified by a CCD camera; a lens unit 76 provided for the imaging portion 74 near the wafer W; and a light 78 used as illuminating means for ensuring brightness for excellent imaging by the imaging portion 74. The detection apparatus 72 is attached with a z-axis motor 80 for the detection apparatus. The z-axis motor 80 for the detection apparatus is used as a driving source for moving the detection apparatus 72 in the z-axis direction with reference to the movable unit 44. Vertically moving the detection apparatus 72 allows the imaging portion 74 to focus on the transfer member 62 or the like.

As mentioned above, the supporting member 45 is attached to the movable unit 44 so as to be movable in the z-axis direction. The movable unit 44 is attached to the supporting post 42 so as to be movable in the x-axis direction. Accordingly, controlling the x-axis motor 56 and the z-axis motor 64 for the supporting member can move the transfer member 62 along with the supporting member 45 in the x-axis and z-axis directions. As mentioned above, driving the y-axis motor 32 and the θ-axis motor 34 moves and rotates the support base 14 along with the movable base 24 in the y-axis direction. Therefore, controlling the y-axis motor 32, the x-axis motor 56, the z-axis motor 64 for the supporting member, and the θ-axis motor 34 can change the relative positional relation among the wafer W, the light irradiation unit 60, and the transfer member 62.

Changing the relative positional relation between the wafer W and the transfer member 62 can allow the light curable composition applied to the wafer W and the transfer member 62 to contact or separate from each other. According to the embodiment, the y-axis motor 32, the x-axis motor 56, the z-axis motor 64 for the supporting member, and the θ-axis motor 34 as well as the feed screws 28, 52, and 58 are used as moving apparatuses for moving at least one of the light curable composition and the transfer member 62 so that the light curable composition and the transfer member 62 contact or separate from each other. Control over the y-axis motor 32, the x-axis motor 56, and the z-axis motor 64 for the supporting member, and the θ-axis motor 34 will be described later in detail.

According to the embodiment mentioned above, the light curable composition is a curable composition that cures due to radiated light. The above-mentioned embodiment uses the light curable composition as an article to be molded. The article to be molded is capable of being transformed to the shape of the transfer member 62 when the transfer member 62 is contacted or pressed. It is possible to use appropriate materials that can cure while the transformed state is maintained. For example, it is possible to use the heat curable composition that is the curable composition described above and cures due to heating. The embodiment uses the light irradiation unit for curing the light curable composition as a curing apparatus for curing an article to be molded. An appropriate curing apparatus may be selected in accordance with a material used as an article to be molded. For example, a heater for heating a heat curable composition may be selected as the curing apparatus when the heat curing resin is used as an article to be molded as mentioned above.

Figure 2:
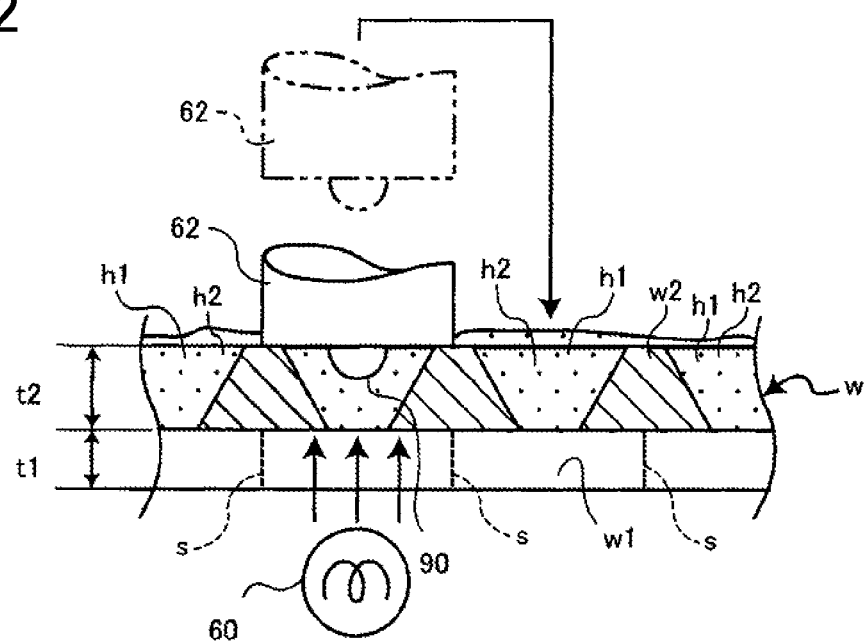
FIG. 2 A partial cross-sectional view which shows a transfer member and a wafer used in the first embodiment of the present invention.

FIG. 2 shows the transfer member 62 and the wafer W in detail.

As shown in FIG. 2, the wafer W is structured so that a holding plate W2 is layered over a substrate W1. The substrate W1 is made of an optically transparent material such as glass, for example, and has a thickness t1 of 400μ. The holding plate W2 is used to hold a light curable composition at a specified position when the resin, before being cured, is liquid and highly fluid, for example. The holding plate W2 is made of silicon, for example, and has a thickness t2 of 725μ, for example. Multiple through-holes h1 are vertically formed in the holding plate W2. Each through-hole h1 is conic so as to be narrowed from top to bottom.

Multiple through-holes h1 are formed in the holding plate W2 positioned above the substrate W1. The substrate W1 seals the bottom of the through-holes h1. As a result, the substrate W1 contains multiple concave holes h2 so formed as to be sealed at the bottom and opened toward the top. A scribe layer (cutting portion) S is formed, for example, inside the substrate W1 between adjacent through-holes h1 in the substrate W1. The position in which the scribe layer S is formed in the substrate W1 has strength lower than other portions. Therefore, the substrate W1 is divided at the scribe layer S when done so.

The transfer member 62 is made of metal, for example. The transfer member 62 is shaped equally to a lens portion 312 (e.g., see FIG. 8 to be described later) used as an aspherical lens portion or has a transfer shape formed reversely to the lens portion 312. The transfer shape is formed as a protruded portion 90, for example. The transfer member 62 is used to transform the light curable composition to the shape of the protruded portion 90. Hardening the transformed light curable composition allows transfer of the transfer shape formed on the transfer member 62 to the light curable composition. The protruded portion 90 is aspherical and is formed by mechanically processing the metal transfer member 62 such as machining using machine tools including a machining center, for example.

An article to be molded needs to be highly accurately molded by transferring the transfer shape formed on the transfer member 62. Accordingly, for example, the transfer shape needs to be highly accurately formed on the transfer member 62 as the protruded portion 90. The protruded portion 90 has an aspherical shape and is difficult to process. Processing of the transfer member 62 often requires a longtime and high costs. For this reason, the embodiment forms only one transfer shape on the transfer member 62 to shorten the process time and reduce the costs.

The aspherical shape signifies a surface shape other than a curved surface shape that corresponds to part of a spherical surface. In optical parts such as a lens portion 312, the aspherical shape is expressed by the following aspherical shape equation (1).

$$Z=C \cdot \rho 2/[1+\{1-(1+\kappa 1) \cdot C2 \cdot \rho 2\}^{1/2}] \quad \text{equation (1)}$$

where C denotes the inverse of curvature radius R; ρ denotes the height of a mirror face from an optical axis; z denotes the sag quantity; and κ1 denotes the constant of the cone.

In FIG. 2, the spin coat is used to apply the light curable composition to the entire upward surface of the wafer W. The applied light curable composition flows into the through-holes h2 of the holding plate W2 so as to be held by the holding plate W2. As shown, the transfer member 62 contacts the held light curable composition so that at least the protruded portion 90 contacts the light curable composition. In this state, the light irradiation unit 60 is used to radiate light to and near a position of the light curable composition in contact with the protruded portion 90. The light curable composition cures to transfer the transfer shape formed on the protruded portion to the light curable composition. After the light curable composition cures, the transfer member 62 is separated from the wafer W as indicated by a dash-double-dot line in FIG. 2. As indicated by an arrow in FIG. 2, for example, the transfer member 62 moves so as to contact a cured curable composition held in a through-hole h2 adjacent to the through-hole h2 that holds the cured curable composition.

Figure 3:
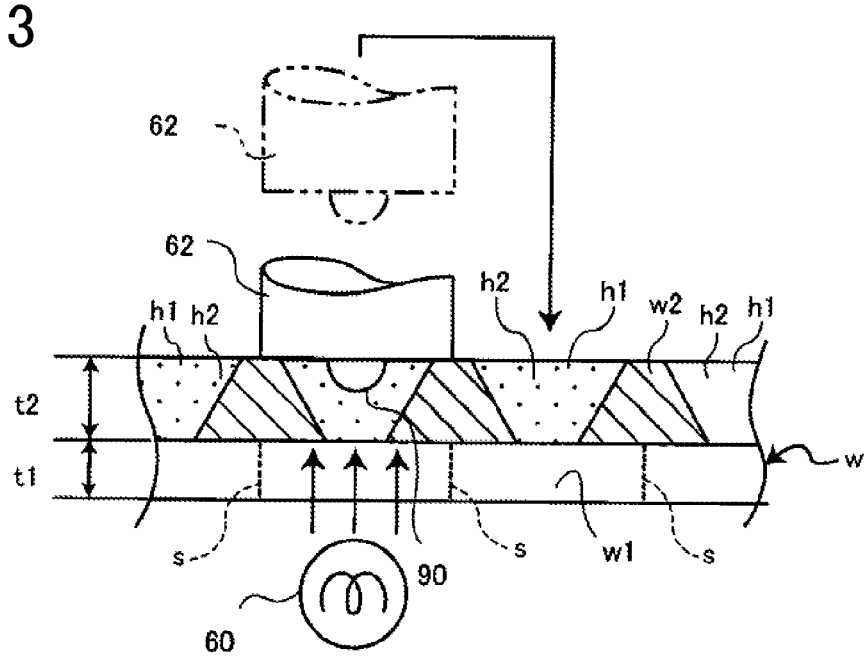
FIG. 3 An explanatory diagram showing a modification example of a process to inject a light curable composition into a hole formed in a wafer used for the molding apparatus according to the first embodiment of the invention.

There has been described the case where the spin coat is used to apply the light curable composition to the entire upward surface of the wafer W. Instead, as shown in FIG. 3, an injection apparatus (not shown) may be used to inject the light curable composition into the multiple holes h2 formed in the wafer W. The transfer member 62 contacts the light curable composition held by the holding plate W2 so that at least the protruded portion 90 contacts the light curable composition. The protruded portion 90 contacts the light curable composition held in one hole h2 and the light is radiated. At this time, the light curable composition is already injected in a hole h2 adjacent to that hole h2. After the light curable composition cures in one hole h2, the transfer member 62 is separated from the wafer W as indicated by a dash-double-dot line in FIG. 3. As indicated by an arrow in FIG. 3, the transfer member 62 moves so as to contact an uncured curable composition held in a hole h2 adjacent to the hole h2 that holds the cured curable composition. The transfer member 62 now contacts the curable composition held in that adjacent hole h2. Before the transfer member 62 moves to a further adjacent hole h2, the injection apparatus injects the light curable composition into a still further adjacent hole h2.

As shown in FIG. 3, the injection apparatus is used to inject the light curable composition into the hole h2. The light curable composition is transformed to the transfer member 62 (transformation step). For this purpose, the light curable composition is injected into the wafer W where multiple holes h2 are formed in advance (injection step). The transfer member 62 contacts the light curable composition injected into the hole h2 (contact step). To transform the light curable composition, the light curable composition is injected into the hole h2 (injection step) and the transfer member 62 contacts the light curable composition injected into the hole h2 (contact step). In addition, the injection step and the contact step are alternately repeated multiple times.

Figure 4:
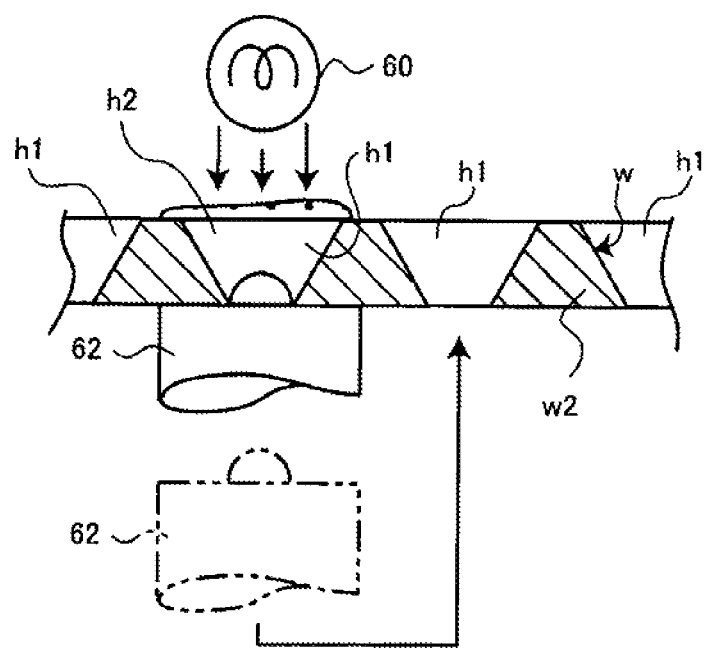
FIG. 4 A partial sectional view showing a first modification example of a transfer member and a wafer used for the molding apparatus according to the first embodiment of the present invention.

FIG. 4 shows a first modification example of the wafer W. The wafer W according to the above-mentioned embodiment uses a layer of the substrate W1 and the holding plate W2. A substrate W1 according to the first modification example uses only a holding plate W2. When the substrate W1 according to the first modification example is used, the configuration of the molding apparatus 10 needs to be modified so as to be capable of the following: the transfer member 62 contacts the holding plate W2 from below so as to cover at least one of through-holes h1 from below; the light curable composition is supplied from above into the hole h2 that is formed by being covered from below; and the light is radiated from above to the light curable composition supplied to the hole h2. The wafer W according to the first modification example is used as follows: after the light curable composition injected into the hole h2 cures, the transfer member 62 moves so as to cover the adjacent through-hole h1 from below; and the injection apparatus then injects the light curable composition into the adjacent hole h2 that is formed by covering the through-hole h1. FIG. 3 uses the same reference numerals to depict the same parts or components as those for the wafer W according to the above-mentioned embodiment and a detailed description is omitted for simplicity.

As mentioned above, the holding plate W2 holds the light curable composition when the wafer W to be used includes or is equivalent to the holding plate W2. The light curable composition is available at multiple small-volume spaces in small quantity. When not held by the holding plate W2, the light curable composition is continuously available all over the wafer W surface. Therefore, when the light curable composition shrinks, the accumulated shrinkage causes an error between the position to transfer the shape of the transfer member 62 and an intended position. The holding plate W2 can solve this problem. It is possible to decrease the quantity of the light curable composition to be used in comparison with a case of applying the light curable composition all over the substrate W1 surface without using the holding plate W2.

Figure 5:
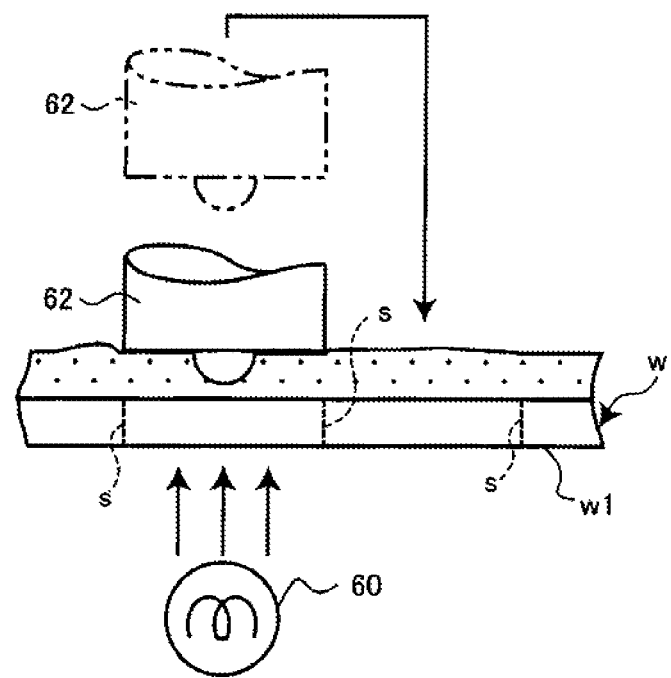
FIG. 5 A partial sectional view showing a second modification example of a transfer member and a wafer used for the molding apparatus according to the first embodiment of the present invention.

FIG. 5 shows a second modification example of the wafer W.

The wafer W according to the above-mentioned embodiment uses a layer of the substrate W1 and the holding plate W2. According to the second modification example, however, the wafer W includes the substrate W1 without using the holding plate W2. When the wafer W according to the second modification example is used, the spin coat is used to apply the light curable composition all over the wafer W surface. The transfer member 62 sequentially transfers the shape to the light curable composition applied to the wafer W.

Since the wafer W according to this second modification example does not have the holding plate W2, the light curable composition is continuously present on the entire surface of the wafer W. When the light curable composition shrinks, the accumulated shrinkage may cause an error between the position to transfer the shape of the transfer member 62 and an intended position. To prevent such error from occurring, it is desirable to change a pitch distance between positions for contact of the transfer member 62 with the light curable composition in accordance with the shrinkage of the light curable composition to be used. That is, there is a pitch distance between one position for transferring the transfer member 62 and another position that is adjacent to that position and allows the transfer member to contact the light curable composition. It is desirable to configure and change that pitch distance so as to be longer than an intended pitch distance after the light curable composition to be used cures in accordance with a shrinking percentage. FIG. 5 uses the same reference numerals to depict the same parts or components as those for the wafer W according to the above-mentioned embodiment and a detailed description is omitted for simplicity.

Figure 6:
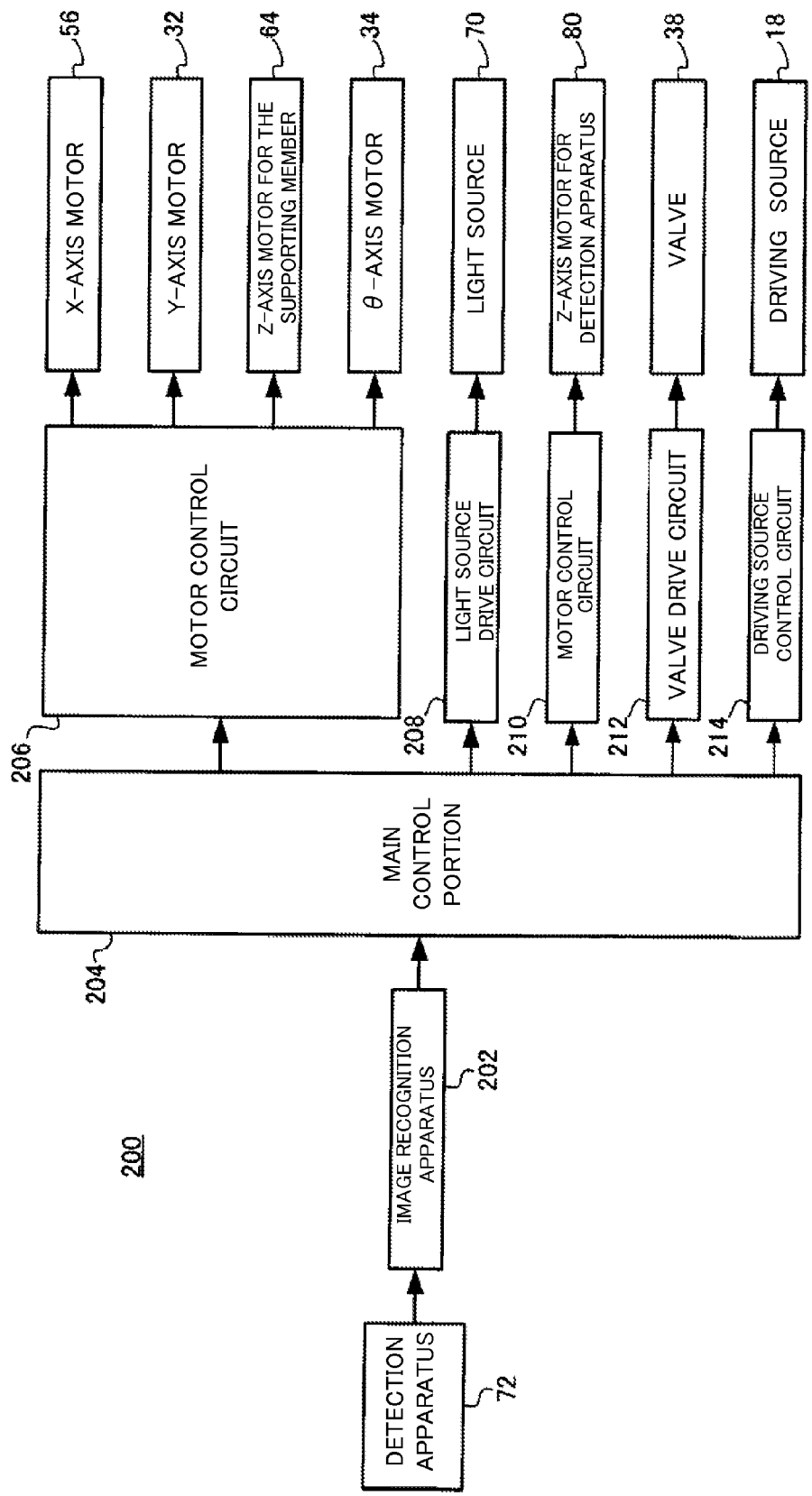
FIG. 6 A block diagram showing a control apparatus used in the molding apparatus according to the first embodiment of the present invention.

FIG. 6 is a block diagram showing a control apparatus 200 included in the molding apparatus 10.

As shown in FIG. 6, the control apparatus 200 includes a main control portion 204 supplied with outputs from the detection apparatus 72 via an image recognition apparatus 202 that recognizes an image captured by the detection apparatus 72. The main control portion 204 controls a motor control circuit 206 to control the y-axis motor 32, the x-axis motor 56, the z-axis motor for the supporting member 64, and the θ-axis motor 34. The main control portion 204 controls a light source drive circuit 208 to control the light source 70. The main control portion 204 controls a motor control circuit 210 to control the z-axis motor 80 for the detection apparatus. The main control portion 204 controls a valve drive circuit 212 to control the valve 38. The main control portion 204 controls a driving source control circuit 214 to control the driving source 18. As mentioned above, the molding apparatus 10 may be provided with an injection apparatus (not shown) that injects the light curable composition into the hole h2 formed in the wafer W. In this case, the control apparatus 200 also controls the injection apparatus.

Figure 7:
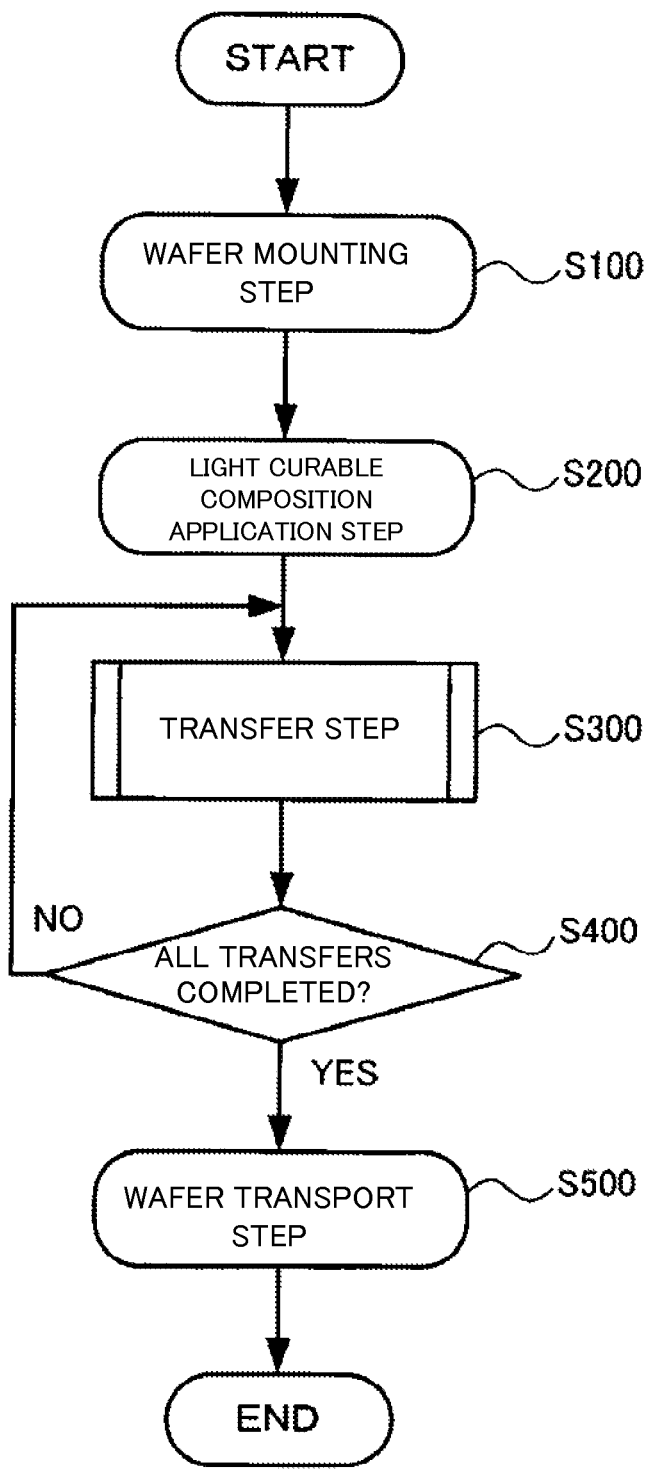
FIG. 7 A first flowchart showing operations of the molding apparatus according to the first embodiment of the present invention.

FIG. 7 is a first flowchart showing control of the control apparatus 200 over the molding apparatus 10. The first flowchart shows steps of molding a lens array which is a molded article and an optical part. Herein, the term "lens array" denotes an optical part in which a plurality of lens portions are formed in a single component. The first flowchart shows steps of applying the light curable composition all over the wafer W using the spin coat, for example.

When a sequence of steps starts, Step S100 performs a mounting step of mounting the wafer W on the support base 14. Next, Step S200 performs a light curable composition application step of applying the light curable composition to the wafer W. During the light curable composition application step, the main control portion 204 controls the valve drive circuit 212 to open the valve 38 for a specified time period and supply the light curable composition to the surface of the wafer W. After completely supplying the light curable composition, the main control portion 204 controls the driving source control circuit 214 to drive the driving source 18 for a specified time period. The driving source 18 is driven to rotate the support base 14. Due to a centrifugal force, the light curable composition supplied to the wafer W mounted on the support base 14 spreads almost evenly over the surface of the wafer W.

Next, Step S300 performs a transfer step of transferring the transfer shape formed on the transfer member 62 to the light curable composition. The transfer step at Step S300 will be described later in detail.

The next Step S400 determines whether or not all the transfer steps are completed. For example, the transfer step may be repeated 1500 through 2400 times. Step S400 determines whether or not the last transfer step is reached. Control returns to Step S300 when Step S400 determines that the last transfer step is not reached. Control proceeds to Step S500 when Step S300 determines that the last transfer step is reached.

Since the transfer is completed on the light curable composition applied to the wafer W, Step S500 transports the wafer W mounted on the support base 14 outside the molding apparatus 10. The molding apparatus 10 may not include an apparatus such as a robot that mounts the wafer W on the support base 14 and transports the wafer W from the molding apparatus 10. In this case, an operator manually mounts the wafer W on the support base 14 and removes the wafer W from the molding apparatus 10. The main control portion 204 omits control over the operations at Steps S100 and S500.

Figure 8:
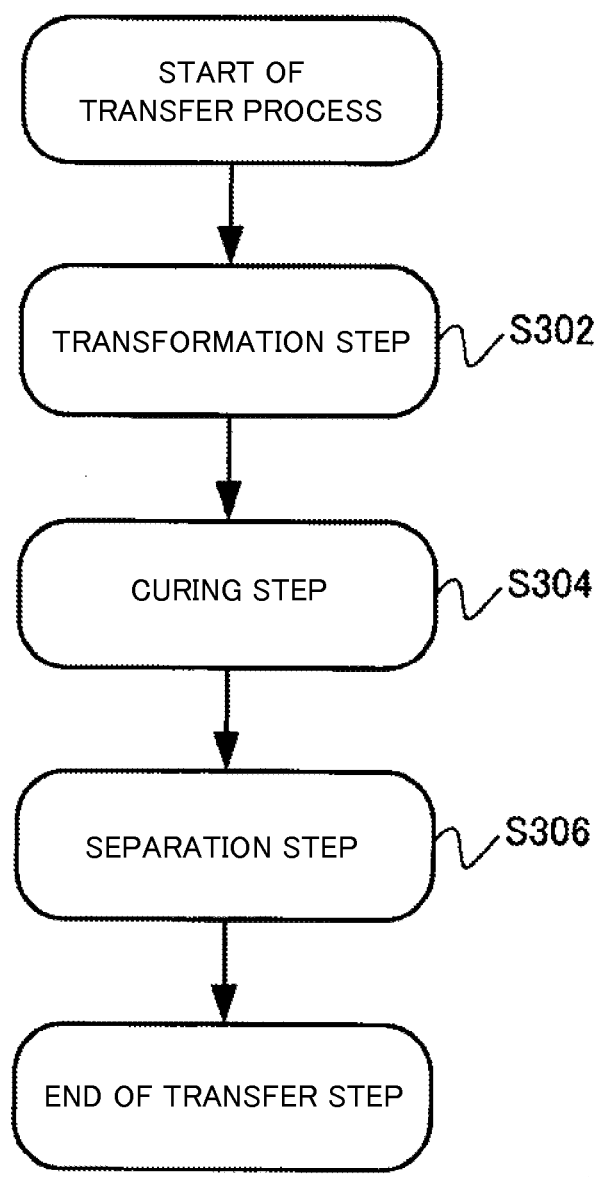
FIG. 8 A first flowchart showing transfer operations of the molding apparatus according to the first embodiment of the present invention.

FIG. 8 is a first flowchart showing the transfer step of the control apparatus 200. The flowchart shows the detail of control over the transfer step (Step S300) for transferring the transfer shape formed on the transfer member 62 to the heat curable composition when, for example, the spin coat is used to apply the light curable composition to the entire surface of the wafer W.

When the transfer step starts, Step S302 performs a transformation step of transforming the light curable composition applied to the wafer W in accordance with the transfer shape formed on the transfer member 62. At Step S302, the main control portion 204 controls the motor control circuit 206 to drive the y-axis motor 32, the x-axis motor 56, the z-axis motor 64 for the supporting member, and the θ-axis motor 34. At least one of the transfer member 62 and the support base 14 is moved so that the transfer member 62 contacts a specified position of the light curable composition applied to the wafer W to transform the light curing composition.

The transformation step at Step S302 may use data that is detected by the detection apparatus 72 and is image-processed by the image recognition apparatus 202. Based on the data, position correction data may be generated for the support base 14 and the transfer member 62 so that the transfer member 62 contacts the light curable composition at a correct position. Based on the correction data, the main control portion 204 may provide control so as to move at least one of the transfer member 62 and the support base 14.

The transformation step at Step S302 transforms the light curable composition to the protruded portion 90 of the transfer member 62. The protruded portion 90 of the transfer member 62 is aspherically shaped and is processed so as to be shaped reversely to each lens portion (optical part portion) constructing the lens array. Therefore, the light curable composition is transformed to the protruded portion 90 having an aspherical shape so that the light curable composition is transformed into the shape of the concave aspherical lens portion. In this embodiment, the transfer member 62 having the protruded portion 90 is used to form the concave lens portion. However, the step selectively uses the transfer member 62 having a transfer portion processed reversely to a shape of the optical part portion to be formed. For example, the transfer member 62 having a concave portion to form a convex lens portion is used.

The type of the light curable composition to be used is taken into consideration in choosing the transfer member 62. Transfer members to be selected are provided with differently sized and shaped protruded portions 90 in accordance with shrinking percentages of light curable compositions to be used even when the same shape is finally formed. That is, the transfer member 62 is changed in accordance with shrinkage during formation of the light curable composition.

Step S304 performs a curing step of curing the light curable composition that is transformed to the transfer member 62 by contact with the transfer member 62. That is, the main control portion 204 controls the light source drive circuit 208 so that the light source 70 radiates light for a predetermined time period to at least part of the light curable composition transformed due to contact with the transfer member 62. After the curing step at Step S304, the light curable composition cures while it is transformed to the lens portion shape. One lens portion is formed on the light curable composition.

Step S306 performs a separation step of separating the cured light curable composition from the transfer member 62. The main control portion 204 controls the motor control circuit 206 to drive the z-axis motor 64 for the supporting member so that the transfer member 62 in contact with the heat curable composition moves upward.

Steps S302, S304, and S306 described above are completed to terminate the transfer step as a sequence. Terminating the transfer step forms one lens portion on the light curable composition. As shown in FIG. 6, the transfer step is repeated until all transfers are completed in accordance with the number of lens portions to be formed. As many lens portion shapes as the number of repeated transfer steps are formed on the light curable composition to form the lens array.

Figure 9:
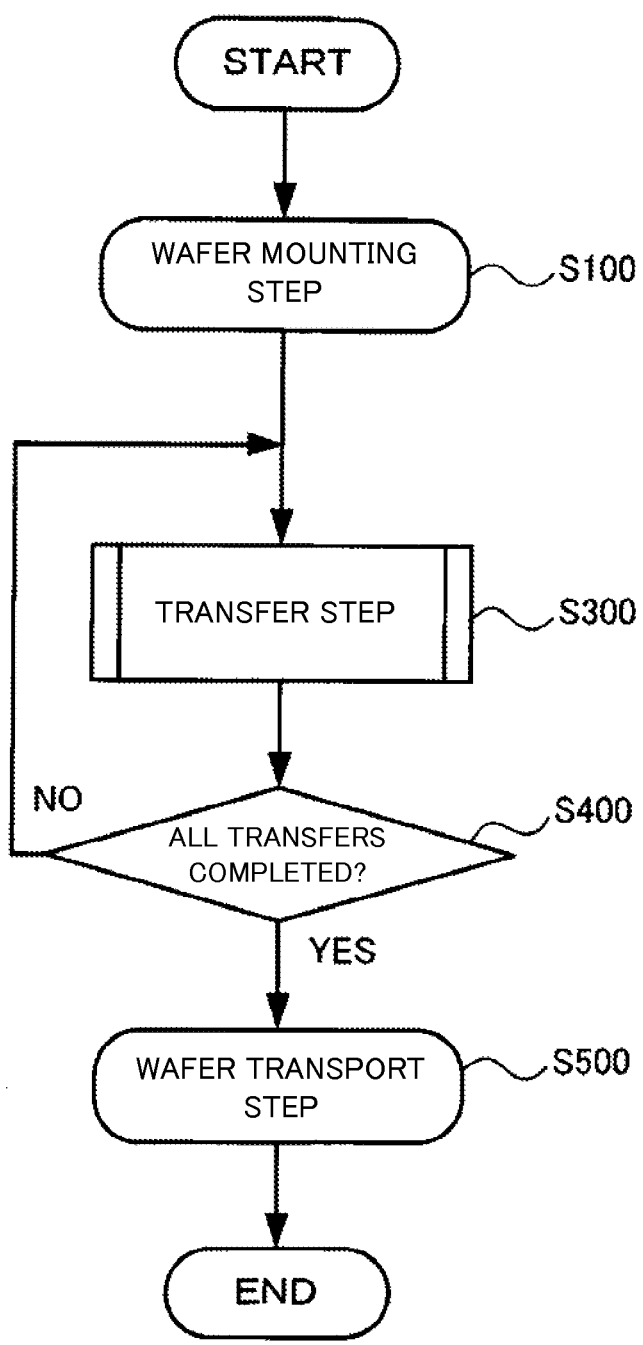
FIG. 9 A second flowchart showing operations of the molding apparatus according to the first embodiment of the present invention.

FIG. 9 is a second flowchart showing control of the control apparatus 200 over the molding apparatus 10 and depicts steps of molding the lens array, which is a molded article and an optical part. The above-mentioned first flowchart shows the steps of applying the light curable composition to the entire surface of the wafer W using the spin coat, for example. On the other hand, the second flowchart shows steps of using an injection apparatus (not shown) to inject the light curable composition into multiple holes h2 (see FIG. 2) formed in the wafer W.

Of the steps of the above-mentioned first flowchart, Step S100 performs the mounting step of mounting the wafer W on the support base 14, Step S200 applies the light curable composition to the entire surface of the wafer W, Step S300 transfers the transfer shape formed on the transfer member 62 to the light curable composition, Step S400 determines whether or not all the transfer steps are completed, and Step S500 transported the wafer W outside the molding apparatus 10.

On the other hand, the steps of the second flowchart are void of Step S200 that applies the light curable composition to the entire surface of the wafer W. As will be described later, the transfer step at Step S300 injects the curable composition into the hole h2 formed in the wafer W.

Figure 10:
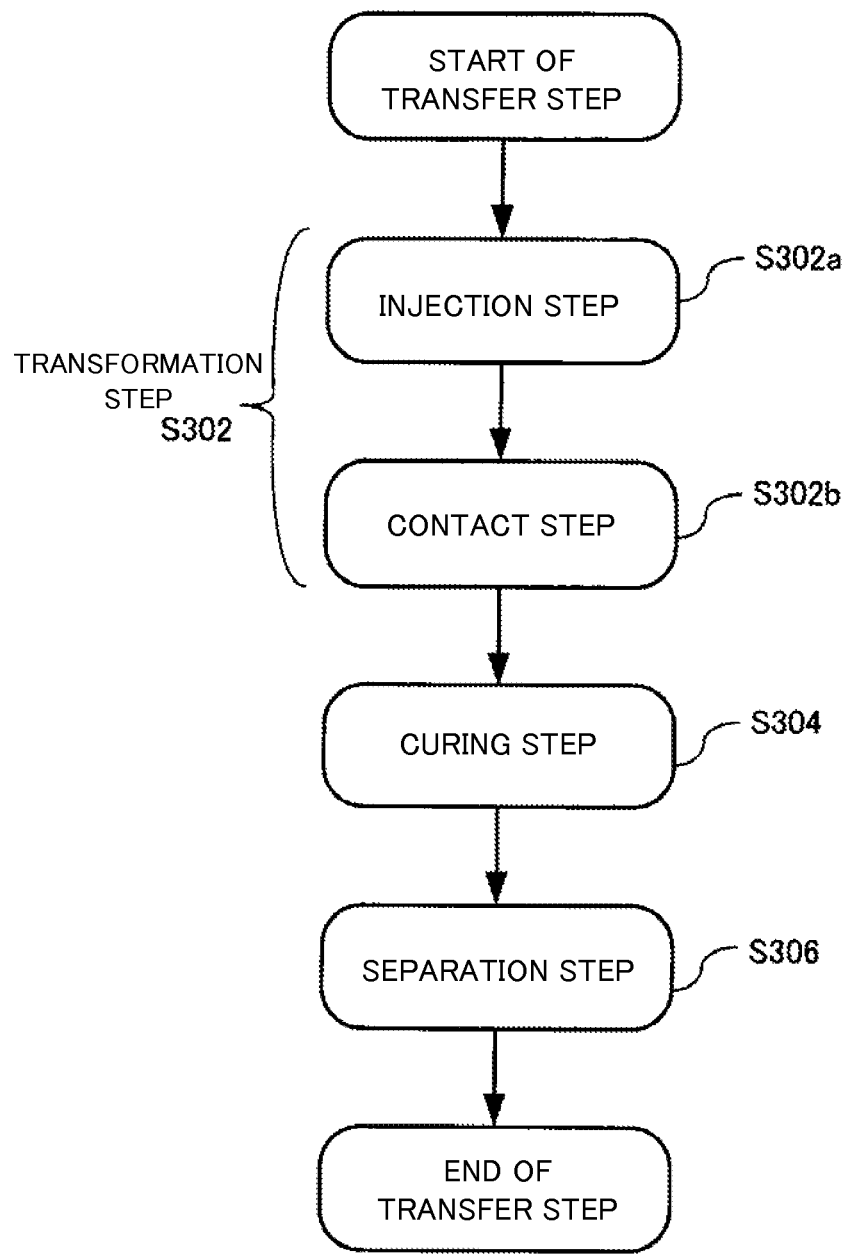
FIG. 10 A second flowchart showing transfer operations of the molding apparatus according to the first embodiment of the present invention.

FIG. 10 is the second flowchart showing the transfer step of the control apparatus 200 when the injection apparatus is used to inject the light curable composition into the holes h2 formed in the wafer W. The flowchart shows in detail control over the transfer step (Step S300) that transfers the transfer shape formed on the transfer member 62 to the heat curable composition.

When the transfer step starts, Step S302 performs a transformation step of transforming the light curable composition to the transfer shape formed on the transfer member 62. The transformation step includes an injection step (Step S302$a$) and a contact step (Step S302$b$). Step S302$a$ injects the light curable composition into one of the holes h2 formed on the wafer W (Step 302$a$). Step S302$b$ contacts the transfer member 62 with the light curable composition that is injected into one of the holes h2 at Step S302$a$. At Step S302, the main control portion 204 controls the injection apparatus to inject the light curable composition into one of the holes h2 formed in the wafer W. The main control portion 204 then controls the motor control circuit 206 to move at least one of the transfer member 62 and the support base 14 so that the transfer member 62 contacts the hole h2 injected into one of the holes h2.

Step S304 performs the curing step of curing the light curable composition formed to the transfer member 62. The main control portion 204 allows the light source 70 to radiate light to at least the curable composition injected into the hole h2 at Step S302$a$. After the curing step at Step S304, the light curable composition injected into the hole h2 cures as transformed to the shaped of the lens portion, forming one lens portion.

Step S306 performs the separation step of separating the transfer member 62 from the cured light curable composition injected into the hole h2.

A sequence of transfer steps terminates at Steps S302$a$, S302$b$, S304, and S306 as mentioned above. When the transfer step terminates, the light curable composition is injected into one of the holes h2 formed in the wafer W. The light curable composition is transformed and cured in accordance with the transfer shape formed on the transfer member 62 to form one lens portion. As shown in FIG. 9, the transfer step is repeated as many times as the number of lens portions to be formed until all the transfer steps terminate. The result is to form as many shapes of the lens portion as the number of transfer steps repeated on the light curable composition, molding a lens array.

FIG. 11 illustrates a step of producing a lens which is an optical part having a lens portion including at least one aspherical shape using a lens array 304 molded in the steps described above.

Figure 11A:
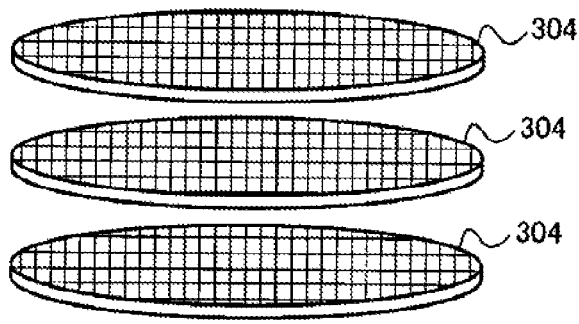
FIG. 11 An explanatory diagram which illustrates the steps in a method for producing a lens according to the first embodiment of the present invention.
Figure 11B:
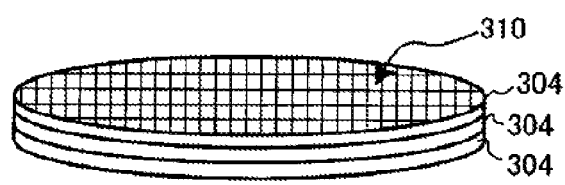

First, as shown in FIGS. 11A and 11B, a multiple sheets of the formed lens arrays are cemented as necessary by means of adhesion, for example (cementing step). FIG. 11A shows three lens arrays 304 before being cemented, while FIG. 11B shows a lens array 310 including the three lens arrays 304 cemented together.

Second, the cemented lens array 310 cemented in the cementing step is divided by cutting, for example, so as to provide at least one lens portion (dividing step). A lens is produced by dividing the cemented lens array 310. Herein, as previously mentioned, forming the scribe layer S (refer to FIG. 2) on the wafer W facilitates the division of the cemented lens array 310.

Figure 11C:
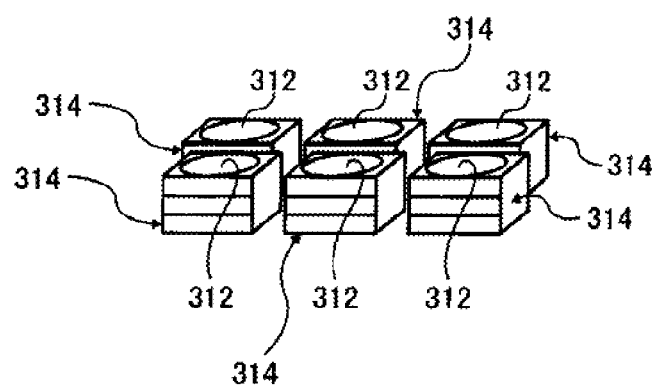

FIG. 11C shows a lens 314 produced by cutting the cemented lens array 310 so as to include one lens portion 312. The cemented lens array 310 includes the lens arrays 304 that are cemented so as to be layered. For example, the lens 314 may be attached to a light receiving element such as a CMOS sensor, making it possible to produce a camera. The produced camera may be built in a mobile telephone, for example.

In the above-mentioned lens producing process, it is described that multiple lens arrays 304 are cemented to form a cemented lens array and that the cemented lens array 310 is divided to produce the lens 314 having multiple lens portions. The lens arrays 304 may be independently divided without being cemented to form single-layer lenses 314. The lens array 304 and the cemented lens array 310 may be used as they are without being divided.

A second embodiment of the present invention will be now described.

In the first embodiment, the lens array 304 (refer to FIG. 11) was molded using the molding apparatus 10 (refer to FIG. 1). In this second embodiment, in contrast, a mold used for molding a lens array is formed using the molding apparatus 10. As in the first embodiment, the mold is molded by a mounting step S100, a light curable composition application step S200, a transfer step S300, and a wafer transport step S500. The transfer step S300 is repeated as many times as the number of the lens portions in the lens array molded finally.

In the above-described first embodiment, the transfer member 62 having the transfer portion processed to be shaped reversely to the aspherical lens portion formed in the lens array 304 was used as the transfer member 62 (refer to FIG. 2). In contrast, in this second embodiment, the transfer member 62 having the lens portion processed to be shaped equally to the lens portion of the lens array formed finally is used. Therefore, the shape of the lens portion 312 of the lens array 304 formed finally is transferred to the mold for molding the molded lens.

FIG. 12 illustrates the step of molding the lens array as a primary optical part, and the step of dividing the molded lens array to produce a lens as a secondary optical part by using the mold which is molded using the molding apparatus 10 in the second embodiment of the present invention.

Figure 12A:
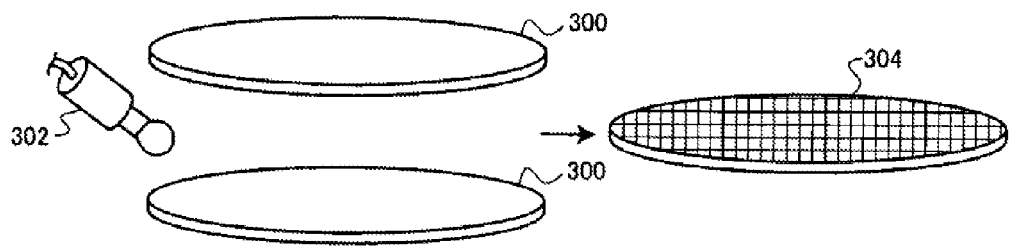
FIG. 12 An explanatory diagram which illustrates the steps of a method for producing a lens according to the second embodiment of the present invention.
Figure 12B:
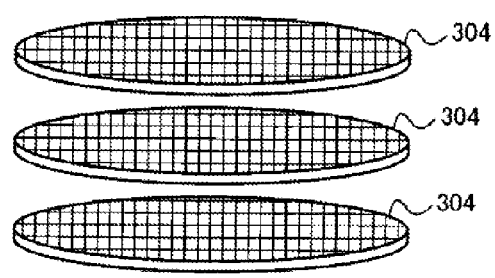

To mold a lens array and produce a lens using the mold which is molded by the molding apparatus 10, first, as shown in FIG. 12A, a mold 300 is molded using the molding apparatus 10 (molding step), and a lens array 304 is molded using the molded mold 300, for example, by the nanoimprint technique (lens array molding step). For example, two molds 300 are prepared; the two molds 300, 300 are disposed with their surfaces onto which the shape of the transfer member 62 (refer to FIG. 2) is transferred facing with other; for example, a material of the lens array such as a curable composition is provided using the supply apparatus 302; a material such as a curable composition is transformed to the shape of the molds 300, 300 and cured in this state; and a lens array having the shape reverse to the shape of the transfer surface of the molds 300 is molded. At this time, for example, as in the production of the molds 300, when the light curable composition is used as a material of the lens array, the curable composition can be cured by radiating light.

Instead of supplying the material of the lens array between the molds 300, 300 by disposing the two molds 300 with their surfaces on which the shape of the transfer member 62 is transferred facing each other, the face of the mold 300 on which the shape of the transfer member 62 is transferred and a flat plate having a flat surface may be disposed to oppose each other, and the material of the lens array may be supplied between the mold 300 and the flat plate.

Figure 12C:
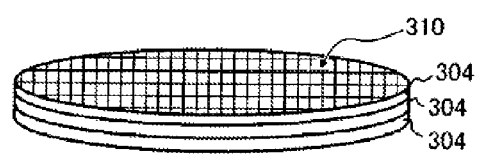
Figure 12D:
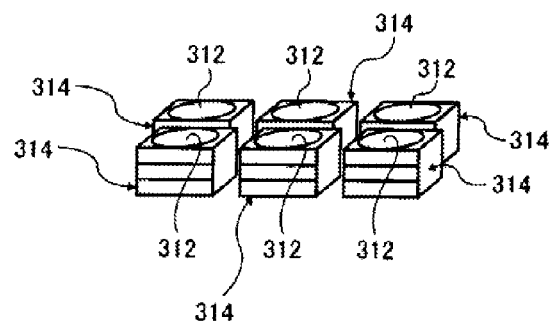

As the lens array formed in the first embodiment described previously, as shown in FIG. 12B, multiple lens arrays formed are cemented as needed (cementing step). FIG. 12C shows a cemented lens array 310. The cemented lens array 310 is divided so as to provide at least one lens portion (dividing step). As shown in FIG. 12D, a lens 314 having a lens portion 312 is produced. As the lens produced in the first embodiment described above, for example, the lens 314 may be attached to a light receiving element of a CMOS sensor for producing cameras. A produced camera may be built in a mobile telephone, for example.

As in the above first embodiment, the lens array 304 produced in the second embodiment may be divided without being cemented to form a single-layer lens 314. The lens array 304 and the cemented lens array 310 may be used as they are without being divided.

In the first embodiment described above, an example of formation of the lens array is described, while in the second embodiment, an example of molding the mold used for molding the lens array is described. Molded articles which can be molded by using the molding apparatus 10 include not only optical parts such as lens arrays and molds for molding optical parts, but also electroforming molds and electroforming bath used for electroforming, for example.

The curable composition used for the present invention will be described below in detail.

[Curable Composition]

The curable composition used for the present invention includes (a) silica fine particles; (b) (meth)acrylate having two or more ethylenically unsaturated groups and no cyclic structure (hereinafter referred to simply as "reactive (meth) acrylate (b)"); (c) (meth)acrylate having one ethylenically unsaturated group and having an alicyclic structure (hereinafter also referred to simply as "reactive (meth)acrylate (c)"); and (d) a polymerization initiator. The silica fine particles (a) are characteristically surface-treated with a specific silane compound. These constituents will be described below. It should be noted that (meth)acrylate used herein means methacrylate and/or acrylate.

<(a) Silica Fine Particles>

Silica fine particles (a) preferably used for the curable composition may be those having an average particle diameter of 1 to 100 nm. If the average particle diameter is smaller than 1 nm, the viscosity of the curable composition produced is increased; the content of the silica fine particles (a) in the curable composition is restricted; dispersibility of the silica fine particles (a) in the curable composition is lowered; and sufficient transparency and heat resistance may not be obtained in a cured article (hereinafter also referred to simply as cured article) obtained by curing the curable composition. If the average particle diameter is larger than 100 nm, the transparency of the cured article may be lowered in some cases.

The average particle diameter of the silica fine particles (a) is, in terms of the balance between the viscosity of the curable composition and the transparency of the cured article, more preferably 1 to 50 nm, still more preferably 5 to 50 nm, and most preferably 5 to 40 nm. The average particle diameter of the silica fine particles (a) can be determined by observing the silica fine particles with a high-resolution transmission electron microscopy (H-9000 produced by Hitachi, Ltd.), optionally selecting 100 silica particle images from the images of the fine particles observed, and calculating a number average particle diameter by a conventional image data statistical processing method.

To increase the amount of the silica fine particles (a) loaded into the cured article, silica fine particles having different average particle diameters may be used in combination in the curable composition. Porous silica sol, complex metal oxides of silicon with aluminium, magnesium, zinc and the like may be also used as the silica fine particles (a).

The amount of the silica fine particles (a) contained in the curable composition is preferably 20 to 80% by mass as the surface-treated silica fine particles. More preferably, in terms of the balance between the heat resistance and environmental resistance of the cured article and the viscosity of the curable composition, the amount is 40 to 60% by mass. Within this range, the fluidity of the curable composition and the dispersibility of the silica fine particles (a) in the curable composition are favorable. Therefore, using such a curable composition allows for easy production of a cured article with sufficient strength, heat resistance, and environmental resistance.

In terms of dispersibility in the curable composition, the silica fine particles (a) used are preferably dispersed in an organic solvent. A preferably used organic solvent is one that dissolves organic components ((meth)acrylate (b) and (meth)acrylate (c) described later, etc.) contained in the curable composition.

Examples of the organic solvent include alcohols, ketones, esters, and glycol ethers. In terms of the ease of solvent removal in a solvent removal step for removing the organic solvent from a mixed solution of the silica fine particles (a), (meth)acrylate (b) and (meth)acrylate (c) described later, methanol, ethanol, isopropyl alcohol, butyl alcohol, n-propyl alcohol and like alcohols, methyl ethyl ketone, methyl isobutyl ketone and like ketone-based organic solvents are preferable.

Among these, isopropyl alcohol is especially preferable. When the silica fine particles (a) dispersed in isopropyl alcohol are used, the viscosity of the curable composition after solvent removal is lower than in the case where other solvent is used, and therefore a curable composition having a low viscosity can be stably produced.

Such silica fine particles dispersed in an organic solvent can be produced by a conventional method, and is also commercially available, for example, under the trade name Snowtex IPA-ST (produced by Nissan Chemical Industries, Ltd.). When the silica fine particles (a) used are dispersed in an organic solvent, the aforementioned amount of the silica fine particles (a) contained in the curable composition of the present invention denotes the amount of the silica fine particles per se contained in the composition.

The silica fine particles (a) used in the curable composition used for the present invention are surface-treated with the silane compound (e) and silane compound (f). The silane compounds will be described below.

<(e) Silane Compound>

The silane compound (e) is represented by general formula (1) below.

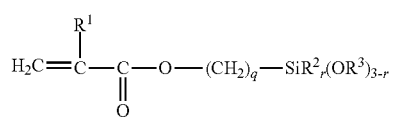

(1)

in general formula (1), R1 represents a hydrogen atom or a methyl group; R2 represents a C1 to C3 alkyl group or a phenyl group; R3 represents a hydrogen atom or a C1 to C10 hydrocarbon group; q is an integer from 1 to 6; and r is an integer from 0 to 2.

From the perspective of reducing the viscosity of the curable composition and the storage stability, preferable R2 is a methyl group; preferable R3 is a methyl group; preferable q is 3; and preferable r is 0.

The silane compound (e) is used in order to decrease viscosity of the curable composition, to improve dispersion stability of the silica fine particles (a) in the curable composition by the reaction of the silane compound (e) with the reactive (meth)acrylate described later, and to reduce curing shrinkage during curing of the curable composition thereby to impart molding processability to the cured article. That is to say, unless the silica fine particles (a) are surface-treated with the silane compound (e), viscosity of the curable composition is increased, and besides, curing shrinkage in the curing process is increased. Consequently, the cured article becomes brittle, and a crack tends to occur. This is not preferable.

Examples of the silane compounds (F) include γ-acryloxypropyldimethylmethoxysilane, γ-acryloxypropylmethyldimethoxysilane, γ-acryloxypropyldiethylmethoxysilane, γ-acryloxypropylethyldimethoxysilane, γ-acryloxypropyltrimethoxysilane, γ-acryloxypropyldimethylethoxysilane, γ-acryloxypropylmethyldiethoxysilane, γ-acryloxypropyldiethylethoxysilane, γ-acryloxypropylethyldiethoxysilane, γ-acryloxypropyltriethoxysilane, γ-methacryloxypropyldimethylmethoxysilane, γ-methacryloxypropylmethyldimethoxysilane, γ-methacryloxypropyldiethylmethoxysilane, γ-methacryloxypropylethyldimethoxysilane, γ-methacryloxypropyltrimethoxysilane, γ-methacryloxypropyldimethylethoxysilane, γ-methacryloxypropylmethyldiethoxysilane, γ-methacryloxypropyldiethylethoxysilane, γ-methacryloxypropylethyldiethoxysilane and γ-methacryloxypropyltriethoxysilane.

From the viewpoints of prevention of aggregation of the silica fine particles (a), decrease of viscosity of the curable composition and storage stability of the curable composition, γ-acryloxypropyldimethylmethoxysilane, γ-acryloxypropylmethyldimethoxysilane, γ-methacryloxypropyldimethylmethoxysilane, γ-methacryloxypropylmethyldimethoxysilane, γ-acryloxypropyltrimethoxysilane and γ-methacryloxypropyltrimethoxysilane are preferable, and γ-acryloxypropyltrimethoxysilane is more preferable. These compounds may be used in combination of two or more kinds.

Such a silane compound (e) can be produced by a conventional method, and is also commercially available.

The amount of the silane compound (e) used in surface-treating the silica fine particles (a) is normally 5 to 25 parts by weight, preferably 10 to 20 parts by weight, and more preferably 12 to 18 parts by weight, with respect to 100 parts by weight of the silica fine particles (a). When the amount of the silane compound (e) used is lower than 5 parts by weight, the viscosity of the curable composition is increased. This may lower the dispersibility of the silica fine particles (a) in the curable composition and cause gelation. When the amount is higher than 25 parts by weight, agglomeration of the silica fine particles (a) may occur. When the silica fine particles (a) used are dispersed in an organic solvent, the mass of the silica fine particles (a) is that of the silica fine particles per se dispersed in the organic solvent. The surface treatment of the silica fine particles (a) will be described later.

When the curable composition contains a large amount of acrylate (acrylate (b) and reactive acrylate (c) described later), it is preferable to use the silane compound (e) having an acrylic group is contained, i.e., the silane compound (e) represented by general formula (1) in which R1 is a hydrogen atom. When the curable composition contains a large amount of methacrylate(methacrylate (b) and methacrylate (c) described later), it is preferable to use the silane compound (e) containing a methacrylic group, i.e., the silane compound (e) represented by general formula (1) in which R1 is a methyl group. In such a case, a curing reaction is facilitated when the curable composition of the present invention is cured.

<(f) Silane Compound>

The silane compound (f) used for the present invention is represented by general formula (2) below.

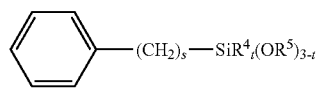

(2)

In general formula (2), R4 represents a C1 to C3 alkyl group or a phenyl group; R5 represents a hydrogen atom or a C1 to C10 hydrocarbon group; s is an integer from 0 to 6; and t is an integer from 0 to 2. A substituent may be coupled to the phenyl group as long as the effects of the present invention are not impaired.

From the perspective of reducing the viscosity of the curable composition and the storage stability, preferable R4 is a methyl group; preferable R5 is a methyl group; preferable s is 0 or 1; and preferable t is 0.

Reaction between the silica fine particles (a) and the silane compound (f) imparts hydrophobicity to the surface of the silica fine particles (a). This improves the dispersibility of the silica fine particles in the organic solvent, and reduces the viscosity of the curable composition due to its good compatibility with the (meth)acrylate (c) described later. Accordingly, the storage stability of the curable composition is improved, and at the same time the water absorption of the same can be reduced.

Examples of the silane compound (f) include phenyldimethylmethoxysilane, phenylmethyldimethoxysilane, phenyldiethyldimethoxysilane, phenylethyldimethoxysilane, phenyltrimethoxysilane, phenyldimethylethoxysilane, phenylmethyldiethoxysilane, phenyldiethylethoxysilane, phenylethyldiethoxysilane, phenyltriethoxysilane, benzyldimethylmethoxysilane, benzylmethyldimethoxysilane, benzyldiethylmethoxysilane, benzylethyldimethoxysilane, benzyltrimethoxysilane, benzyldimethylethoxysilane, benzylmethyldiethoxysilane, benzyldiethylethoxysilane, benzylethyldiethoxysilane and benzyltriethoxysilane.

From the viewpoints of decrease of viscosity of the curable composition and storage stability and improvement of environmental resistance of the curable composition including water absorption, phenyldimethylmethoxysilane, phenylmethyldimethoxysilane, phenyldiethylmethoxysilane, phenylethyldimethoxysilane and phenyltrimethoxysilane are preferable, and phenyltrimethoxysilane is more preferable. These compounds may be used in combination of two or more kinds.

Such a silane compound (f) can be produced by a conventional method, and is also commercially available.

The amount of the silane compound (f) used in the surface treatment of the silica fine particles (a) is normally 5 to 25 parts by mass, preferably 10 to 20 parts by mass, and more preferably 12 to 18 parts by mass, with respect to 100 parts by mass of the silica fine particles (a). If the amount of the silane compound (f) used is smaller than 5 parts by mass, viscosity of the curable composition is increased, which may cause gelation and a decrease in the heat resistance of the cured article. If the amount the silane compound (f) used is larger than 25 parts by weight, agglomeration the silica fine particles (a) may occur. When the silica fine particles (a) used are dispersed in an organic solvent, the mass of the silica fine particles (a) is that of the silica fine particles per se dispersed in the organic solvent. The surface treatment of the silica fine particles (a) will be described later.

If the total amount of the silane compound (e) and the silane compound (f) exceeds 50 parts by mass with respect to 100 parts by mass of the silica fine particles (a), reaction of the silica particles with one another takes place in the heat treatment of the silica fine particles (a) and thereby aggregation and gelation of the silica fine particles (a) are liable to occur, because the amount of the treating agent is too large.

<(b) (Meth)acrylate>

Examples of the (meth)acrylate (b) having two or more ethylenically unsaturated groups and no cyclic structure used for the present invention include trimethylolpropane tri(meth)acrylate, pentaerythritol tri(meth)acrylate, pentaerythritol tetra(meth)acrylate, dipentaerythritol tetra(meth)acrylate, dipentaerythritolpenta(meth)acrylate, dipentaerythritol hexa(meth)acrylate, trimethylolpropane trioxyethyl(meth)acrylate and the like.

The curable composition containing these substances of the present invention is cured to form a cured article with excellent heat resistance.

Among these, from the viewpoint of the heat resistance of the cured article, the (meth)acrylate having three ethylenically unsaturated groups is preferable, and the (meth)acrylate having a glass transition temperature of the homopolymer of 150° C. or higher is still more preferable. In particular, trimethylolpropane tri(meth)acrylate is the most preferable since its homopolymer has a glass transition temperature of 200° C. or higher and it exhibits relatively low curing shrinkage among multifunctional (meth)acrylates.

The glass transition temperature of the homopolymer is measured by the following method. One part by weight of diphenyl-2,4,6-trimethylbenzoyl phosphine oxide is dissolved in 100 parts by weight of (meth)acrylate (b) (trade name: Speedcure TPO-L produced by Nihon SiberHegner K. K.) as a photopolymerization initiator. The solution is applied over a glass substrate (50 mm×50 mm) to form a cured film with a thickness of 100 μm. The resulting film is exposed to light at 3 J/cm2 using an exposure device in which an extra-high pressure mercury lamp was incorporated, to cure the coating films. The cured film obtained is measured for its tan δ using DMS 6100 (produced by Seiko Instruments & Electronics Ltd.) in a tensile mode under the conditions of a measuring range of 20 to 300° C., a heating rate of 2° C./min., and a frequency of 1 Hz. The glass transition temperature can be determined from the peak temperature of tan δ.

The amount of the (meth)acrylate (b) formulated in the curable composition is preferably 20 to 500 parts by weight with respect to 100 parts by weight of the silica fine particles (a) before being surface-treated. From the viewpoint of the viscosity of the curable composition, the dispersion stability of the silica fine particles (a) in the curable composition and the heat resistance of the cured article, the amount is more preferably 30 to 300 parts by weight, and still more preferably 50 to 200 parts by weight. If the amount of the (meth)acrylate (b) formulated is lower than 20 parts by weight, the viscosity of the curable composition is increased, which may cause gelation. If the amount of the (meth)acrylate (b) formulated is higher than 500 parts by weight, shrinkage of the curable composition during curing is increased, which may cause the cured article warp or crack. When the silica fine particles (a)

used are dispersed in an organic solvent, the mass of the silica fine particles (a) is that of the silica fine particles per se dispersed in the organic solvent.

<(c) (Meth)acrylate>

The (meth)acrylate (c) having an ethylenically unsaturated group and having an alicyclic structure which is used for the curable composition is used to impart heat resistance and environmental resistance to the cured article and to reduce shrinkage during curing. In particular, (meth)acrylate having one ethylenically unsaturated group and having an alicyclic structure is suitably used. Examples of such (meth)acrylates include cycloalkyl(meth)acrylates, such as cyclohexyl(meth)acrylate, 4-butylcyclohexyl(meth)acrylate, dicyclopentanyl (meth)acrylate, dicyclopentenyl(meth)acrylate, dicyclopentadienyl(meth)acrylate, bornyl(meth)acrylate, isobornyl (meth)acrylate, tricyclodecanyl(meth)acrylate, tricyclodecane dimethanol diacrylate, and adamantyl(meth)acrylate.

From the perspective of the heat resistance of the cured article, (meth)acrylate whose homopolymer has a glass transition temperature of 150° C. or higher is preferable. The method for measuring the glass transition temperature of homopolymer is as described above.

Among the above-mentioned examples of (meth)acrylates, dicyclopentanyl(meth)acrylate and adamantyl(meth)acrylate are preferable from the perspective of the transparency, heat resistance, and environmental resistance of the cured article, and adamantyl(meth)acrylate whose homopolymer has a high glass transition temperature is the most preferable.

It should be noted that the alicyclic structure means such a structure in which carbon atoms are annularly coupled, excluding the aromatic cyclic structure.

The amount of the (meth)acrylate (c) formulated in the curable composition is preferably 5 to 400 parts by weight with respect to 100 parts by weight of the silica fine particles (a) before being surface-treated. From the viewpoint of the viscosity of the curable composition, the dispersion stability of the silica fine particles (a) in the curable composition and the heat resistance of the cured article, the amount of the (meth)acrylate (c) is more preferably 10 to 200 parts by weight, and still more preferably 20 to 100 parts by weight. If the amount of the (meth)acrylate (c) formulated is lower than 5 parts by weight, the viscosity of the curable composition is increased, which may cause gelation of the curable composition. If the amount is higher than 400 parts by weight, cracks may be produced in the cured article and the heat resistance and environmental resistance of the cured article may be lowered. When the silica fine particles (a) used are dispersed in an organic solvent, the mass of the silica fine particles (a) is that of the silica fine particles per se dispersed in the organic solvent.

<(d) Polymerization Initiator>

Examples of the polymerization initiator (d) used for the curable composition include photopolymerization initiators and thermal polymerization initiators which generate radicals.

Examples of the photopolymerization initiators include benzophenone, benzoin methyl ether, benzoin propyl ether, diethoxyacetophenone, 1-hydroxy-phenyl ketone, 2,6-dimethylbenzoyl diphenylphosphine oxide, 2,4,6-trimethylbenzoyldiphenylphosphine oxide and diphenyl-2,4,6-trimethylbenzoylphosphine oxide. These photopolymerization initiators may be used in combination of two or more kinds.

The amount of the photopolymerization initiator contained in the curable composition may be any amount which allows the curable composition to cure appropriately, and is preferably 0.01 to 10 parts by weight, more preferably 0.02 to 5 parts by weight, and still more preferably 0.1 to 2 parts by weight, with respect to 100 parts by weight of the curable composition. If the amount of the photopolymerization initiator added is too large, a decrease in the storage stability, discoloration, or crosslinking of the curable composition may occur. This may abruptly move ahead the crosslinking in obtaining the cured article and generate cracks and other problems during curing. If the amount of the photopolymerization initiator added is too low, the curable composition may not be sufficiently cured.

Examples of the thermal polymerization initiator mentioned above include benzoyl peroxide, diisopropyl peroxycarboante, t-butyl peroxy(2-ethylhexanoate) and the like.

The amount of the thermal polymerization initiator contained in the curable composition is preferably 2 parts by weight or lower, and more preferably 0.1 to 2 parts by weight, with respect to 100 parts by weight of the curable composition.

The curable composition used for the present invention may contain, as necessary, leveling agents, antioxidants, ultraviolet absorbers, solvents, pigments, other fillers such as inorganic fillers, reactive diluents, other modifiers, and others unless the viscosity of the composition, the transparency and heat resistance of the cured article and other properties are impaired.

Examples of the leveling agent include polyether-modified dimethylpolysiloxane copolymer, polyester-modified dimethylpolysiloxane copolymer, polyether-modified methyl alkyl polysiloxane copolymer, aralkyl-modified methyl alkyl polysiloxane copolymer, and polyether-modified methyl alkyl polysiloxane copolymer.

Examples of the fillers or pigments include calcium carbonate, talc, mica, clay, Aerosil (registered trademark), barium sulfate, aluminium hydroxide, zinc stearate, zinc oxide, red iron oxide, and azo pigments.

The viscosity of the curable composition of the present invention containing such various kinds of components measured using a B type viscometer DV-II+Pro (produced by Brookfield Engineering) at 25° C. and 60 rpm using a rotor No. 63 is normally 30 to 300 mPa·s. Therefore, the curable composition has an extremely low viscosity even it does not contain a solvent, and thus has good handling characteristics. This is attributed to the high compatibility with the (meth) acrylates (b) and (c) of the silica fine particles (a) and the high dispersion stability of the silica fine particles (a) in the (meth) acrylates (b) and (c) due to the surface treatment of the silica fine particles (a) stated above.

<Method for Producing Curable Composition>

The curable composition used for the present invention can be produced, for example, by successively carrying out the following steps: a step (Step 1) of surface-treating colloidal silica (silica fine particles (a)) dispersed in an organic solvent with the silane compounds (e) and (f); a step (Step 2) of adding the (meth)acrylates (b) and (c) to the surface-treated silica fine particles (a) and homogenously mixing them; a step (Step 3) of removing the organic solvent and water from the homogeneously mixed solution of the silica fine particles (a) and the (meth)acrylates (b) and (c) obtained in the Step 2, that is, a solvent removal step; and a step (Step 4) of adding the polymerization initiator (d) to the composition having been subjected to solvent removal in the Step 3 and homogeneously mixing them to give a curable composition. The steps will be described below.

(Step 1)

In Step 1, the silica fine particles (a) are surface-treated with the silane compounds (e) and (f). The surface treatment include the steps of placing the silica fine particles (a) into a reactor; adding the silane compounds (e) and (f) to the reactor with stirring; and adding water and a catalyst required for hydrolysis of the silane compounds with stirring to cause hydrolysis of the silane compounds and condensation polymerization on the surface of the silica fine particles (a). It should be noted that the silica fine particles (a) used are preferably dispersed in an organic solvent, as mentioned above.

Disappearance of the silane compounds by the hydrolysis can be confirmed by a gas chromatography. The remaining amount of the silane compounds can be measured on an internal reference method by a gas chromatography (Model 6850, produced by Agilent Technologies Inc.) and a hydrogen flame ionization detector using a nonpolar column DB-1 (produced by J&W Scientific) at a He flow rate of 1.2 cc/min., which is used as a carrier gas, and at a temperature increasing rate of 10° C./min. within a temperature range of 50 to 300° C. Therefore, the disappearance of the silane compounds by the hydrolysis can be confirmed.

In addition, as described above, the amount of the silane compound (e) used when the silica fine particles (a) is surface-treated is, with respect to 100 parts by mass of the silica fine particles (a), generally 5 to 25 parts by mass, preferably 10 to 20 parts by mass, and more preferably 12 to 18 parts by mass. Further, the amount of the silane compound (f) is, with respect to 100 parts by mass of the silica fine particles (a), generally 5 to 25 parts by mass, preferably 10 to 20 parts by mass, and more preferably 12 to 18 parts by mass.

The lower limit of the amount of water necessary to carry out the hydrolysis reaction is one time the total number of moles of an alkoxy group and a hydroxy group bonded to the silane compounds (e) and (f), and the upper limit is ten times the total number described above. When the amount of water is excessively small, the hydrolysis rate is decreased considerably, and as a result, the economical efficiency may be degraded, or the surface treatment may not be sufficiently advanced in some cases. Conversely, when the amount of water is excessively large, the silica fine particles (a) may be gelled in some cases.

When the hydrolysis reaction is performed, a catalyst for hydrolysis reactions is generally used. As specific examples of the catalyst, there may be mentioned inorganic acids such as hydrochloric acid, acetic acid, sulfuric acid and phosphoric acid;
organic acids such as formic acid, propionic acid, oxalic acid, para-toluenesulfonic acid, benzoic acid, phthalic acid and maleic acid;
alkaline catalysts such as potassium hydroxide, sodium hydroxide, calcium hydroxide and ammonia;
organic metals;
metal alkoxides;
organotin compounds such as dibutyltin dilaurate, dibutyltin dioctylate and dibutyltin diacetate;
metal chelate compounds such as aluminum tris(acetylacetonate), titanium tetrakis(acetylacetonate), titanium bis(butoxy)bis(acetylacetonate), titanium bis(isopropoxy)bis(acetylacetonate), zirconium bis(butoxy)bis(acetylacetonate) and zirconium bis(isopropoxy)bis(acetylacetonate); and
boron compounds such as boron butoxide and boric acid.

Among them, since dissolution in water and sufficient hydrolysis rate are obtained, hydrochloric acid, acetic acid, maleic acid and the boron compounds are preferably used. These catalysts may also be used alone or in combination of two or more kinds thereof.

In Step 1, when the hydrolysis reaction of the silane compounds (e) and (f) is performed, although a water-insoluble catalyst may be used, a water-soluble catalyst is preferably used. In the case in which a water-soluble catalyst for hydrolysis reactions is used, it is preferable that the water-soluble catalyst is dissolved in an appropriate amount of water and is then added to the reaction system, since the catalyst can be uniformly dispersed.

Although the addition amount of the catalyst used for the hydrolysis reaction is not particularly limited, the amount with respect to 100 parts by mass of the silica fine particles (a) is generally 0.1 to 10 parts by mass and preferably 0.5 to 5 parts by mass. In addition, when silica fine particles dispersed in an organic solvent are used as the silica fine particles (a), the mass of the silica fine particles (a) indicates the mass of only the silica fine particles themselves dispersed in the organic solvent.

Although the reaction temperature of the hydrolysis reaction is not particularly limited, it is generally in a range of 10 to 80° C. and preferably in a range of 20 to 50° C. When the reaction temperature is too low, the hydrolysis rate is decreased considerably, and as a result, the economical efficiency may be degraded or the surface treatment may not be sufficiently advanced in some cases. When the reaction temperature is too high, a gelation reaction is liable to occur.

Further, although the reaction time for the hydrolysis reaction is not particularly limited, it is generally in a range of 10 minutes to 48 hours and preferably in a range of 30 minutes to 24 hours.

In addition, although the surface treatment by the silane compound (e) and that by the silane compound (f) in Step 1 may be sequentially performed, they are preferably performed at the same time in consideration of the simplification and efficiency of the reaction process.
(Step 2)

In Step 2, a method for mixing the surface-treated silica particles (a) and the (meth)acrylates (b) and (c) is not particularly limited. For example, there may be mentioned a method in which mixing is performed under room temperature or heating conditions by a mixing device such as a mixer, a ball mill or a triple roll mill and a method in which while stirring is continuously performed in the reactor used in Step 1, the (meth)acrylates (b) and (c) are added and mixed together.
(Step 3)

In Step 3, in order to perform distillation for solvent removal (hereinafter, collectively called solvent removal) of an organic solvent and water from a uniformly mixed liquid of the silica fine particles (a) and the (meth)acrylates (b) and (c), heating is preferably performed under reduced-pressure conditions.

The temperature is preferably maintained at 20 to 100° C., and in view of the balance between the prevention of agglomeration and gelation and the solvent removal rate, the temperature is more preferably 30 to 70° C. and further preferably 30 to 50° C. When the temperature is excessively increased, the fluidity of the curable composition may be extremely degraded or the curable composition may be gelled in some cases.

The degree of vacuum when the pressure is reduced is generally 10 to 4,000 kPa, and in order to maintain the balance between the solvent removal rate and the prevention of agglomeration and gelation, the degree is more preferably 10 to 1,000 kPa and most preferably 10 to 500 kPa. When the value of the degree of vacuum is too large, the solvent removal rate is decreased considerably and the economical efficiency is degraded.

The composition after the solvent removal preferably contains substantially no solvent. The meaning of "substantially" in this context indicates that when the cured article is actually obtained using the curable composition, a solvent removal step need not be performed again. Specifically, the remaining amount of the organic solvent and water in the curable composition is preferably 1 percent by mass or less, preferably 0.5 percent by mass or less, and further preferably 0.1 percent by mass or less.

In Step 3, before the solvent removal is performed, 0.1 parts by mass or less of a polymerization inhibitor may be added with respect to 100 parts by mass of the composition processed by the solvent removal. The polymerization inhibitor is used in order to prevent a polymerization reaction of the components contained in the composition during or after the solvent removal step or during the storage of the curable composition. As the polymerization inhibitor, for example, hydroquinone, hydroquinone monomethyl ether, benzoquinone, p-t-butyl catechol, 2,6-di-t-butyl-4-methylphenol may be mentioned. These may be used alone or in combination of two or more kinds thereof.

After the uniform mixture of the silica fine particles (a) and the (meth)acrylates (b) and (c) obtained through Step 2 is charged into an exclusive device, Step 3 may be performed. Or when Step 2 is performed in the reactor used in Step 1, the Step may be performed in the reactor continuously from Step 2.

(Step 4)

In Step 4, a method in which the polymerization initiator (d) is added to the composition processed by the solvent removal in Step 3 and uniform mixing is then performed is not particularly limited. For example, there may be mentioned a method in which mixing is performed at room temperature by a mixing device such as a mixer, a ball mill or a triple roll mill, and a method in which while stirring is continuously performed in the reactor used in Steps 1 to 3, the polymerization initiator (d) is added and mixed.

Furthermore, if necessary, filtration may also be performed for the curable composition obtained after the polymerization initiator (d) is added and mixed. This filtration is performed to remove foreign substances such as impurities in the curable composition. Although the filtration method is not particularly limited, a pressure filtration method using a filters such as a cartridge type or a membrane type having a pressure filter pore diameter of 1.0 µm, is preferable.

The curable composition used for the present invention can be produced through the respective steps described above. Since the silica fine particles (a) which are the component of this curable composition are treated by the specific silane compounds, the composition has a low viscosity without containing a solvent and has excellent handling properties.

[Cured Article]

The curable composition used for the present invention becomes a cured article by curing which may be used as a member such as an optical lens, a mold for molding optical lenses, an optical disk substrate, a plastic substrate for liquid crystal display elements, a substrate for color filters, a plastic substrate for organic EL display elements, a solar cell substrate, a touch panel, an optical element, an optical waveguide and an LED sealing material.

<Method for Producing Cured Product>

The cured article is obtained by curing the curable composition used for the present invention. As a curing method, for example, a method in which ethylenically unsaturated groups of the (meth)acrylates (b) and (c) are cross-linked by irradiation with active energy rays and a method in which the ethylenically unsaturated groups are thermally polymerized by applying heat may be mentioned. These methods may also be used in combination.

When the curable composition is cured by active energy rays such as ultraviolet rays, a photopolymerization initiator is added into the curable composition in Step 4 described above.

When the curable composition is cured by applying heat thereto, a thermal polymerization initiator is added into the curable composition in Step 4 described above.

The cured article used for the present invention can be obtained, for example, in such a way that after the curable composition of the present invention is coated on a substrate such as a glass plate, a plastic plate, a metal plate or a silicon wafer to form a coating film, the curable composition is irradiated with active energy rays or heated. For the curing, both of the irradiation of active energy rays and the application of heat may be performed.

As a coating method of the curable composition, for example, there may be mentioned coating using a bar coater, an applicator, a die coater, a spin coater, a spray coater, a curtain coater or a roll coater; coating by a screen printing; and coating by dipping.

The coating amount of the curable composition used for the present invention on the substrate is not particularly limited and may be appropriately adjusted in accordance with the purpose. From the viewpoint of the moldability, the amount is set such that the thickness of the coating film obtained after the curing treatment by the irradiation with active energy rays and/or the application of heat is preferably 1 to 200 µm and more preferably 5 to 100 µm.

As the active energy rays used for the curing, electron rays or light in a wavelength range of from ultraviolet rays to infrared rays is preferable.

As the light source, for example, an ultra-high pressure mercury light source or a metal halide light source may be used for ultraviolet rays, a metal halide light source or a halogen light source may be used for visible rays, and a halogen light source may be used for infrared rays. In addition, light sources such as a laser and an LED may also be used.

Although the irradiation amount of the active energy rays is appropriately determined in accordance with the type of light source, the thickness of the coating film and the like, it may be appropriately determined so that the reaction rates of the ethylenically unsaturated groups of the (meth)acrylates (b) and (c) are each preferably 80% or more and more preferably 90% or more.

In addition, after the curing is performed by irradiation with the active energy rays, if necessary, the curing may be further advanced by performing a heat treatment (annealing treatment). The heating temperature in that case is preferably in a range of 80 to 200° C. The heating time is preferably in a range of 10 minutes to 60 minutes.

When thermal polymerization is performed by a heat treatment for curing the curable composition used for the present invention, the heating temperature is preferably in a range of 80 to 200° C. and more preferably in a range of 100 to 150° C. When the heating temperature is lower than 80° C., the heating time must be increased, and as a result, the economical efficiency is liable to be decreased. When the heating temperature is higher than 200° C., a temperature increasing time and a temperature decreasing time are increased as well as an increase in energy cost, and as a result, the economical efficiency is liable to be decreased.

Although the heating time is appropriately determined in accordance with the heating temperature, the thickness of the coating film and the like, it may be appropriately determined so that the reaction rates of the ethylenically unsaturated groups of the (meth)acrylates (b) and (c) are each preferably 80% or more and more preferably 90% or more.

After the curing of the curable composition is performed by thermal polymerization, if necessary, the curing may be further advanced by performing a heat treatment (annealing treatment). The heating temperature in that case is preferably in a range of 150 to 200° C. The heating time is preferably in a range of 5 minutes to 60 minutes.

<Cured Article>

Being excellent in transparency, heat resistance, environment resistance and molding processability, the cured article of the curable composition used for the present invention may be preferably used, for example, as an optical lens, a mold for molding optical lenses, a plastic substrate for liquid crystal display elements, a substrate for color filters, a plastic substrate for organic EL display elements, a solar cell substrate, a touch panel, an optical element, an optical waveguide and an LED sealing agent material.

The refractive index of the cured article may be appropriately selected in accordance with its application. In addition, since the cured article is excellent in heat resistance, the amount of change in refractive index before and after a heat treatment is performed three times at 270° C. for 1 minute is preferably 0.005 or less, more preferably 0.003 or less, and further preferably 0.001 or less. Since the efficiency of utilization of light will be changed when the amount of change in refractive index before and after the heat treatment is performed three times at 270° C. for 1 minute is more than 0.005, it is not preferable for the application in which the light efficiency is important.

Since the cured article is excellent in heat resistance, a 5% weight loss temperature when heating is performed in a nitrogen atmosphere is generally 330° C. or higher, preferably 350° C. or higher, and more preferably 380° C. or higher. When the 5% weight loss temperature when heating is performed is lower than 330° C., for example, if the cured article is used for an active-matrix display element substrate, warpage or deflection may occur in its producing process, and problems such as occurrence of cracks may also arise in some cases.

The cured article is preferably obtained by curing the curable composition containing the (meth)acrylates (b) and (c) whose homopolymers each has a high glass transition temperature. Therefore, the cured article is excellent in heat resistance.

The cured article has a high glass transition temperature. The glass transition temperature of the cured article is obtained from the peak temperature of the loss tangent, or the tan δ value, which is measured at a frequency of 1 Hz using a dynamic-viscoelasticity-measurement method and is generally 200° C. or higher and preferably 230° C. or higher. When the glass transition temperature is lower than 200° C., if the cured article is used for an active-matrix display element substrate, warpage or deflection may occur in the producing process, and problems such as occurrence of cracks, may also arise in some cases.

Since the cured article is excellent in transparency, it has a light transmittance of preferably 85% or higher at a wavelength of 400 nm regarding a cured film having a thickness of 100 μm, and in addition, the amount of change in transmittance at a wavelength of 400 nm before and after a heat treatment is performed three times at 270° C. for 1 minute is usually 3% or less. Since the efficiency of utilization of light will be decreased when the light transmittance at a wavelength of 400 nm is 85% or less, it is not preferable for the application in which the light efficiency is important. Further, when the amount of change in transmittance at a wavelength of 400 nm before and after the heat treatment is performed three times at 270° C. for 1 minute is more than 3%, if the cured article is used for an active matrix display element substrate, a coloring problem may arise in its producing process in some cases.

The water absorption rate of the cured article when the cured article is immersed in water for 24 hours is, with respect to 100% by mass of the cured article, 2 percent by mass or less, preferably 1.5% by mass or less, and more preferably 1.0% by mass or less.

The amount of change in refractive index of the cured article before and after the cured article is immersed in water for 24 hours is 0.001 or less, preferably 0.0008 or less, and more preferably 0.0005 or less. When the amount of change in refractive index is more than 0.001, for example, if the cured article of the present invention is applied for an optical lens or an optical waveguide, the focal distance of light is changed when water absorption occurs under usage conditions, and as a result, the image accuracy or the propagation efficiency of light is unfavorably degraded.

In addition, the amount of change in refractive index of the cured article before and after being stored at 85° C. and 85% saturated humidity for 50 hours is 0.001 or less, preferably 0.0008 or less, and more preferably 0.0005 or less. When the amount of change in refractive index is more than 0.001, for example, if the cured article is applied for an optical lens or an optical waveguide, the focal distance of light is changed when water absorption occurs under usage conditions, and as a result, the image accuracy or the propagation efficiency of light is unfavorably degraded. As a material conventionally used for an optical lens and the like, a poly(methyl(meth)acrylate) may be mentioned. The amount of change in refractive index thereof before and after the storage at 85° C. and 85% saturated humidity for 50 hours is as large as 0.0015 (1.4912-41.4897). The reason for this great change in the refractive index is believed that the cured film swells due to the water absorption under the high humidity/high temperature conditions.

Regarding the cured article, the absolute value of the temperature dependence coefficient of the refractive index within a temperature of 25° C. to 55° C. is $6.0 \times 10^{-5}$/° C. or lower, preferably $5.0 \times 10^{-5}$/° C. or lower, more preferably $4.0 \times 10^{-5}$/° C. or lower. When the absolute value of the temperature dependence coefficient of the refractive index is more than $6.0 \times 10^{-5}$/° C., for example, if the cured article is applied for an optical lens or an optical waveguide, the focal distance of light is changed when the temperature is changed under usage conditions, and as a result, the image accuracy or the propagation efficiency of light is unfavorably degraded. As a material conventionally used for an optical lens and the like, a poly(methyl methacrylate) may be mentioned. The absolute value of the temperature dependence coefficient of the refractive index thereof is $10.5 \times 10^{-5}$/° C., and the change in refractive index with the change in temperature is significant. In addition, the temperature dependence coefficient of the refractive index indicates the slope which is obtained in such a way that after the refractive index is measured every 5° C. within a measurement temperature range of 25° C. to 55° C. using a refractometer, the refractive index is plotted against the measurement temperature.

Example 1

Hereinafter, although the curable composition used for the present invention will be described in detail with reference to Examples, this curable composition is not limited to the following Examples as long as it does not depart from the scope of the present invention.

Preparation of Curable Composition

Example 1 of Preparation of Curable Composition

After 100 parts by mass of isopropyl alcohol-dispersed colloidal silica (silica content: 30% by mass, average particle diameter: 10 to 20 nm, trade name: Snowtex IPA-ST produced by Nissan Chemical Industries Ltd.) was charged in a separable flask, 4.5 parts by mass of γ-methacryloxypropyltrimethoxysilane and 4.5 parts by mass of phenyltrimethoxysilane were added into this separable flask, followed by stirring and mixing. 2.9 Parts by mass of a HCl solution at a concentration of 0.1825% by mass was added and stirred at 20° C. for 24 hours, so that a surface treatment of the silica fine particles was performed.

In addition, the disappearance of γ-methacryloxypropyltrimethoxysilane and phenyltrimethoxysilane by the hydrolysis was confirmed by a gas chromatography (Model 6850, produced by Agilent Technologies Inc.). The measurement was performed on the internal reference method by a hydrogen flame ionization detector using a nonpolar column DB-1 (produced by J&W Scientific) at a He flow rate of 1.2 cc/min., which was used as a carrier gas, and at a temperature increasing rate of 10° C./min. within a temperature range of 50 to 300° C. Phenyltrimethoxysilane and γ-methacryloxypropyltrimethoxysilane disappeared 8 hours after the HCl solution was added.

Next, 22.5 parts by mass of trimethylolpropane triacrylate (trade name: Biscoat #295 produced by Osaka Organic Chemical Industry, Ltd., Tg>250° C.) and 22.5 parts by mass of adamantyl methacrylate (trade name: ADMA produced by Osaka Organic Chemical Industry, Ltd., Tg: 180° C.) were added to a dispersion liquid of the silica fine particles processed by the surface treatment described above, followed by uniform mixing. Then, heating under reduced pressure was carried out at 40° C. and 100 kPa with stirring, so that volatile components were removed. The removal amount of the volatile components was 72.0 parts by mass.

Next, 0.845 parts by mass of diphenyl-(2,4,6-trimethylbenzoyl)phosphine oxide (trade name: Speedcure TPOL produced by Nihon SiberHegner K. K.) as a photopolymerization initiator was dissolved in 84.9 parts by mass of a mother liquor obtained by removal of the volatile components, and a solution obtained thereby was processed by pressure filtration (pressure: 0.2 MPa) using a membrane filter (porous diameter: 1.0 μm), so that a curable composition 1 was obtained.

The viscosity of the curable composition 1 thus obtained was 74 mPa·s. In addition, the viscosity was measured using a B type viscometer DV-II+Pro (produced by Brookfield Inc.) at 25° C. and 60 rpm using a rotor No. 63.

Example 2 of Preparation of Curable Composition

After 100 parts by mass of isopropyl alcohol-dispersed colloidal silica (silica content: 30% by mass, average particle diameter: 10 to 20 nm, trade name: Snowtex IPA-ST produced by Nissan Chemical Industries Ltd.) was charged in a separable flask, 5.4 parts by mass of γ-methacryloxypropyltrimethoxysilane and 3.6 parts by mass of phenyltrimethoxysilane were added into the separable flask, followed by stirring and mixing. 2.9 Parts by mass of a HCl solution at a concentration of 0.1825% by mass was added and stirred at 20° C. for 24 hours, so that a surface treatment of the silica fine particles was performed.

Phenyltrimethoxysilane and γ-methacryloxypropyltrimethoxysilane disappeared 8 hours after the HCl solution was added.

Next, 37.5 parts by mass of trimethylolpropane triacrylate (trade name: Biscoat #295 produced by Osaka Organic Chemical Industry, Ltd., Tg>250° C.) and 7.5 parts by mass of adamantyl methacrylate (trade name: ADMA produced by Osaka Organic Chemical Industry, Ltd., Tg: 180° C.) were added to the silica fine particles processed by the surface treatment, followed by uniform mixing. Then, heating under reduced pressure was carried out at 40° C. and 100 kPa while the mixed solution was stirred, so that volatile components were removed. The removal amount of the volatile components was 72.4 parts by mass.

0.845 Parts by mass of t-butyl peroxy-(2-ethylhexanoate) (trade name: Perbutyl O produced by NOF Corporation) as a thermal polymerization initiator was dissolved in 84.5 parts by mass of a mother liquor obtained by removal of the volatile components, and a solution obtained thereby was processed by pressure filtration (pressure: 0.2 MPa) using a membrane filter (porous diameter: 1.0 μm), so that a curable composition 2 was obtained.

The solvent concentration in the curable composition 2 thus obtained was measured on the internal reference method by a gas chromatography (Model 6850, produced by Agilent Technologies Inc.) and a hydrogen flame ionization detector using a nonpolar column DB-1 (produced by J&W Scientific) at a He flow rate of 1.2 cc/min., which was used as a carrier gas, and at a temperature increasing rate of 10° C./min. within a temperature range of 50 to 300° C.

As a result, the isopropyl alcohol concentration was 0.82% by mass, the methanol concentration was 0.03% by mass, and the water concentration was 0.10% by mass.

In addition, the viscosity of the curable composition 2 thus obtained was 231 mPa·s.

Example 3 of Preparation of Curable Composition

Except that phenyltrimethoxysilane was not used and the amount of the HCl solution at a concentration of 0.1825% by mass was changed to 1.3 parts by mass, a curable composition 3 was obtained in the same manner as in Example 1 of preparation of curable composition.

γ-methacryloxypropyltrimethoxysilane disappeared 8 hours after the HCl solution was added. The viscosity of the curable composition 3 thus obtained was 104 mPa·s.

Example 4 of Preparation of Curable Composition

Except that γ-methacryloxypropyltrimethoxysilane was not used and the amount of the HCl solution at a concentration of 0.1825% by mass was changed to 1.6 parts by mass, a curable composition 4 was obtained in the same manner as in Example 1 of preparation of curable composition.

Phenyltrimethoxysilane disappeared 8 hours after the HCl solution was added. The viscosity of the curable composition 4 thus obtained was 114 mPa·s.

Example 5 of Preparation of Curable Composition

Except that 4.5 parts by mass of cyclohexyltrimethoxysilane was used instead of using phenyltrimethoxysilane and the amount of the HCl solution at a concentration of 0.1825% by mass was changed to 3.1 parts by mass, a curable composition 5 was obtained in the same manner as in Example 1 of preparation of curable composition.

Although γ-methacryloxypropyltrimethoxysilane disappeared 8 hours after the HCl solution was added, cyclohexyltrimethoxysilane did not disappear 48 hours after the HCl solution was added. The viscosity of the curable composition 5 thus obtained was 90 mPa·s.

The compositions of the respective components used for preparation of the above curable compositions are shown in the following Table 1.

TABLE 1

|  | Curable comp. 1 | Curable comp. 2 | Curable comp. 3 | Curable comp. 4 | Curable comp. 5 |
|---|---|---|---|---|---|
| Composition: Isopropyl alcohol-dispersed colloidal silica | 100 | 100 | 10 | 100 | 100 |
| γ-Methacryloxypropyltrimethoxysilane (MPS) | 4.5 | 5.4 | 4.5 | 0 | 4.5 |
| Phenyltrimethoxysilane (PHS) | 4.5 | 3.6 | 0 | 4.5 | 0 |
| Cyclohexyltrimethoxysilane (CHS) | 0 | 0 | 0 | 0 | 4.5 |
| 0.05N HCl solution | 2.9 | 2.9 | 1.3 | 1.6 | 3.1 |
| Trimethylolpropane triacrylate | 22.5 | 37.5 | 22.5 | 22.5 | 22.5 |
| Adamantyl acrylate | 22.5 | 7.5 | 22.5 | 22.5 | 22.5 |
| Dicyclopentadienyl acrylate | 0 | 0 | 0 | 0 | 0 |
| Diphenyl-(2,4,6-trimethylbenzoyl)phosphine oxide | 0.845 | 0 | 0.845 | 0.845 | 0.845 |
| t-Butylperoxy(2-ethylhexanoate) | 0 | 0.845 | 0 | 0 | 0 |

[Preparation of Cured Film]
<Active Energy-Ray Hardening>

In Example 1 and Comparative Examples, the respective curable compositions were coated on separate glass substrates (50 mm×50 mm) so that a cured film had a thickness of 100 μm, and the coating film was cured by exposure at 3 J/cm2 using an exposure device into which an ultra-high pressure mercury lamp was introduced. Then, an annealing treatment was carried out at 180° C. for 30 minutes.
<Heat Curing>

The curable composition 2 of Example 2 was coated on a glass substrate (50 mm×50 mm) so that a cured film had a thickness of 100 μm, and the coating film was cured by a heat treatment at 140° C. for 10 minutes. Then, an annealing treatment was carried out at 180° C. for 30 minutes.
[Performance Evaluation Method]
<Molding Processability>

The degree of processability in which the cured film is processed without occurrence of fractures or cracks when the cured film is peeled off from the glass substrate was evaluated based on the following indexes.

A: Process (peeling) can be performed without occurrence of fractures and cracks.

B: Although fractures are not caused, cracks are partially caused.

C: Fractures are caused, and processability (peeling property) is inferior.
<Transmittance>

The transmittances (T %) of light at a wavelength of 400 nm were measured before and after the cured film thus obtained was heat-treated three times at 270° C. for 1 minute in accordance with JIS-K7105 using a spectrophotometer (UV3100 produced by JASCO Corp.). The results are shown in Table 2. The larger the transmittance value is and the smaller the change in transmittance before and after the heat treatment is, the better the cured film is.
<Refractive Index>

Before and after the cured film thus obtained was heat-treated three times at 270° C. for 1 minute, the refractive index was measured at a measurement temperature of 25° C. using a multi-wavelength Abbe refractometer DR-M2 (produced by Atago. Co. Ltd.). The results are shown in Table 2. The smaller the change in refractive index before and after the heat treatment is, the better the cured film is.
<Glass Transition Temperature Tg>

The tan δ value of the cured film thus obtained in a first temperature increase was measured in a tensile mode, at a temperature increasing rate of 2° C./min. within a temperature range of 20° C. to 300° C., and at a frequency of 1 Hz using DMS6100 (produced by Seiko Electronics Co., Ltd.). The peak temperature of the tan δ value was regarded as the glass transition temperature. The results are shown in Table 2. The higher the glass transition temperature is, the better heat resistance the cured film has.
<5% Weight Loss Temperature>

The 5% weight loss temperature of the cured film thus obtained was obtained by treating it under a nitrogen atmosphere and at a temperature increasing rate of 10° C./min. within a temperature range of 20° C. to 500° C. using a TG-DTA (produced by Seiko Electronics Co., Ltd.). The results are shown in Table 2. The higher the 5% weight loss temperature is, the better heat resistance the cured film has.
<Water Absorption Rate and Change in Refractive Index Before and After Water Immersion>

After the cured film obtained in each Example was immersed in pure water for 24 hours, the water absorption rate was measured based on the change in weight before and after the immersion. At the same time, the refractive indexes were also measured at a measurement temperature of 25° C. using a multi-wavelength Abbe refractometer DRM2 (produced by Atago. Co. Ltd.). The results are shown in Table 3. The lower the water absorption rate is the smaller the change in refractive index is, the better the environment resistance is.
<Change in Refractive Index After Storage at 85° C. and 85% Saturated Humidity for 50 Hours>

The cured film obtained in each Example was stored in a thermo-hygrostat at 85° C. and 85% saturated humidity for 50 hours, and the refractive indexes before and after the storage were measured at a measurement temperature of 25° C. using a multi-wavelength Abbe refractometer DR-M2 (produced by Atago. Co. Ltd.). The results are shown in Table 3. The smaller the change in refractive index is, the better environment resistance the cured film has.
<Temperature Dependence Coefficient of Refractive Index>

After the refractive index of the cured film obtained in each Example was measured every 5° C. within a measurement temperature range of 25° C. to 55° C. using a multi-wavelength Abbe refractometer DR-M2 (produced by Atago. Co. Ltd.), the slope obtained by plotting the refractive index against the temperature was regarded as the temperature dependence coefficient of the refractive index. The absolute value thereof was calculated. The results are shown in Table 3. The smaller the value is, the better environment resistance the cured film has.

<Shrinkage Percentage>

The spin coater method was used to apply a resin solution on a silicon wafer. This substrate with the resin solution applied thereto was measured by an optical thicknessmeter. This film thickness is taken as an initial film thickness. The substrate was exposed under a nitrogen atmosphere to produce a cured film. The thickness of the film was measured by a similar method. This film thickness is taken as the film thickness after exposure. The shrinkage percentage of the cured article was determined by the equation below. The measurement was carried out in five portions, and the measurement values were averaged.

(Initial film thickness−Film thickness after exposure)/
Initial film thickness×100<%>

The results are shown in Table 3. The size and shape of the mold for molding the cured article can be designed using this value.

In curable compositions 3 and 5, although the molding processability is superior, the heat resistance of the cured articles is inferior, and the decrease in transmittance of 400 nm by a heat treatment at 270° C. for 3 minutes is large since the dispersibility of the silica fine particles in the curable compositions is still insufficient.

The cured films of the curable compositions 1 and 2 have water absorption rates of 0.88% and 1.26%, respectively, after the water immersion for 24 hours. The refractive indexes are not substantially changed before and after the water absorption; hence the cured films are each excellent in environment resistance.

In addition, the absolute values of the temperature dependence coefficient of the refractive indexes of the molded cured articles of the curable compositions 1 and 2 are $4.1 \times 10^{-5}$/° C. and $4.5 \times 10^{-5}$/° C., respectively. The absolute value of the temperature dependence coefficient of the refractive index of a poly(methyl methacrylate) which has been conventionally used for an optical lens is $10.5 \times 10^{-5}$/° C. The amount of change in refractive index of the molded cured films of the curable compositions 1 and 2 over the tempera-

TABLE 2

|  | Curable comp. 1 | Curable comp. 2 | Curable comp. 3 | Curable comp. 4 | Curable comp. 5 |
| --- | --- | --- | --- | --- | --- |
| Composition Kinetic viscosity mPa · s | 74 | 231 | 104 | 114 | 90 |
| Curing method | Photo-curing | Heat-curing | Photo-curing | Photo-curing | Photo-curing |
| Molding processability | A | A | A | B | A |
| Transmittance (%) of cured article at 400 nm (before heat treatment) | 89 | 89 | 89 | 82 | 90 |
| After treatment at 270° C. for 1 min. × 3 times | 88 | 90 | 85 | 78 | 85 |
| Refractive index of cured article(before heat treatment) | 1.4988 | 1.4884 | — | — | — |
| After treatment at 270° C. for 1 min. × 3 times | 1.4996 | 1.4986 | — | — | — |
| 5% Weight loss temperature of cured article (° C.) | 338 | 397 | — | — | — |
| Tg of cured article (° C.) | 211 | >230 | — | — | — |

TABLE 3

|  | Curable comp. 1 | Curable comp. 2 |
| --- | --- | --- |
| Water absorption rate of cured article after 24 hrs. of water immersion (%) | 0.88 | 1.26 |
| Refractive index of cured article before water immersion | 1.4988 | 1.4884 |
| Refractive index of cured article after 24 hrs. of water immersion | 1.4984 | 1.4981 |
| Refractive index of cured article before storage at 85° C. and 85% saturated humidity | 1.4988 | 1.4884 |
| Refractive index of cured article after storage at 85° C. and 85% saturated humidity for 50 hrs. | 1.4987 | 1.4983 |
| Absolute value of temperature dependence coefficient of refractive index of cured article (° C.$^{-1}$) | $4.1 \times 10^{-5}$ | $4.5 \times 10^{-5}$ |
| Absorption rate of cured article (%) | 5.79 | 6.48 |

As shown in Table 2, the handling properties of the curable compositions 1 and 2 are excellent since the curable compositions have low viscosities. Furthermore, molded cured films of the curable compositions are not only excellent in molding processability but also excellent in transparency and heat resistance.

In the curable composition 4, the dispersibility of the silica fine particles is inferior, the transmittance at 400 nm is low, and the transparency is inferior.

ture is half or less than that of a poly(methyl methacrylate). That is, the refractive indices of the cured articles of the curable compositions 1 and 2 have a small dependence on the temperature, and hence it has excellent environment resistance.

EXAMPLES

The steps shown in FIGS. 10, 11 and 12 were carried out using the curable compositions 1 to 5 produced by the method shown in Examples 1 to 5 of preparation of curable composition described above. Good lens arrays and molds used for molding lenses could be thus obtained.

INDUSTRIAL APPLICABILITY

As already mentioned, the present invention can be applied to, for example, a lens such as a lens array including aspherical lens portions and a method of molding a molded article such as a mold used for molding such a lens.

The invention claimed is:
1. A method of molding comprising: a transformation step of bringing an article to be molded into contact with a transfer member on which a transfer shape is formed and transforming the article to be molded to the transfer shape, said article to be molded including a light curable composition containing a compound having a polymerizable functional group and a polymerization initiator;

a curing step of curing at least a transformed portion of the article to be molded; and a separation step of separating the article to be molded and the transfer member from each other, the method repeating the transfer step of transferring the transfer shape to the article to be molded multiple times, and changing a pitch distance between positions for contact of the transfer member with the light curable composition or changing the shape of the transfer member in accordance with shrinkage of the light curable composition.

2. A method of molding according to claim 1, wherein the curable composition includes (a) silica fine particles, (b) a (meth)acrylate having two or more ethylenically unsaturated groups and having no cyclic structure, (c) a (meth)acrylate having an ethylenically unsaturated group and having an alicyclic structure, and (d) a polymerization initiator, and the silica fine particles (a) are surface-treated with a silane compound (e) represented by general formula (1) below and a silane compound (f) represented by general formula (2) below:

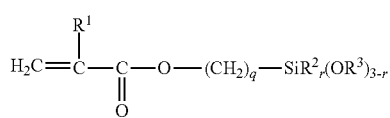

(1)

wherein in general formula (1), $R^1$ represents a hydrogen atom or a methyl group; $R^2$ represents a C1 to C3 alkyl group or a phenyl group; $R^3$ represents a hydrogen atom or a C1 to C10 hydrocarbon group; q is an integer from 1 to 6; and r is an integer from 0 to 2;

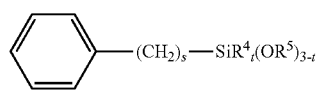

(2)

wherein in general formula (2), $R^4$ represents a C1 to C3 alkyl group or a phenyl group; $R^5$ represents a hydrogen atom or a C1 to C10 hydrocarbon group; s is an integer from 0 to 6; and t is an integer from 0 to 2.

3. The method of molding according to claim 2, wherein the (meth)acrylate (b) contained in the curable composition is (meth)acrylate having three ethylenically unsaturated groups and no cyclic structure.

4. The method of molding according to claim 2, wherein the silica fine particles (a) contained in the curable composition are surface-treated with 5 to 25 parts by weight of the silane compound (e) with respect to 100 parts by weight of the silica fine particles (a) and 5 to 25 parts by weight of the silane compound (f) with respect to 100 parts by weight the silica fine particles (a).

5. The method of molding according to claim 3, wherein the silica fine particles (a) contained in the curable composition are surface-treated with 5 to 25 parts by weight of the silane compound (e) with respect to 100 parts by weight of the silica fine particles (a) and 5 to 25 parts by weight of the silane compound (f) with respect to 100 parts by weight the silica fine particles (a).

6. The method of molding according to claim 2, wherein a glass transition temperature of the homopolymer of the (meth)acrylate (b) contained in the curable composition and a glass transition temperature of the homopolymer of the (meth)acrylate (c) are both 150° C. or higher.

7. The method of molding according to claim 4, wherein a glass transition temperature of the homopolymer of the (meth)acrylate (b) contained in the curable composition and a glass transition temperature of the homopolymer of the (meth)acrylate (c) are both 150° C. or higher.

8. The method of molding according to claim 5, wherein a glass transition temperature of the homopolymer of the (meth)acrylate (b) contained in the curable composition and a glass transition temperature of the homopolymer of the (meth)acrylate (c) are both 150° C. or higher.

9. The method of molding according to claim 6, wherein a glass transition temperature of the homopolymer of the (meth)acrylate (b) contained in the curable composition and a glass transition temperature of the homopolymer of the (meth)acrylate (c) are both 150° C. or higher.

10. The method of molding according to claim 1, wherein the viscosity of the curable composition is 30 to 300 mPa·s.

11. The method of molding according to claim 2, wherein the viscosity of the curable composition is 30 to 300 mPa·s.

12. The method of molding according to claim 3, wherein the viscosity of the curable composition is 30 to 300 mPa·s.

13. The method of molding according to claim 4, wherein the viscosity of the curable composition is 30 to 300 mPa·s.

14. The method of molding according to claim 5, wherein the viscosity of the curable composition is 30 to 300 mPa·s.

15. The method of molding according to claim 6, wherein the viscosity of the curable composition is 30 to 300 mPa·s.

16. The method of molding according to claim 7, wherein the viscosity of the curable composition is 30 to 300 mPa·s.

17. The method of molding according to claim 8, wherein the viscosity of the curable composition is 30 to 300 mPa·s.

18. The method of molding according to claim 9, wherein the viscosity of the curable composition is 30 to 300 mPa·s.

* * * * *